(12) United States Patent
Shiroishi et al.

(10) Patent No.: US 7,537,505 B2
(45) Date of Patent: May 26, 2009

(54) MANUFACTURING METHOD FOR FIELD EMISSION DISPLAY

(75) Inventors: Tetsuya Shiroishi, Tokyo (JP); Akihiko Hosono, Tokyo (JP); Shuhei Nakata, Tokyo (JP); Yoshihito Imai, Tokyo (JP); Takaaki Iwata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 673 days.

(21) Appl. No.: 11/086,418

(22) Filed: Mar. 23, 2005

(65) Prior Publication Data

US 2005/0221710 A1  Oct. 6, 2005

(30) Foreign Application Priority Data

| Mar. 24, 2004 | (JP) | ............................. 2004-087537 |
| May 12, 2004 | (JP) | ............................. 2004-142661 |
| Mar. 7, 2005 | (JP) | ............................. 2005-062496 |

(51) Int. Cl.
*H01J 9/12* (2006.01)
*H01J 1/62* (2006.01)

(52) U.S. Cl. ........................... 445/50; 445/49; 313/495

(58) Field of Classification Search ............. 445/49–50, 445/46, 24; 313/495–497
See application file for complete search history.

(56) References Cited

U.S. PATENT DOCUMENTS

| 5,635,791 | A | * | 6/1997 | Vickers ...................... 313/309 |
| 6,943,493 | B2 | * | 9/2005 | Uemura et al. .............. 313/495 |
| 7,341,498 | B2 | * | 3/2008 | Takai et al. .................... 445/50 |
| 2003/0090190 | A1 | * | 5/2003 | Takai et al. ................. 313/311 |
| 2004/0095050 | A1 | * | 5/2004 | Liu et al. .................... 313/309 |

(Continued)

FOREIGN PATENT DOCUMENTS

CN           1428813 A        7/2003

(Continued)

OTHER PUBLICATIONS

Chen, Kuo-Ji et al., "Improvement of Field Emission Characteristics of Nanotubes by Excimer Laser Treatment," Jpn. J. Appl. Phys., vol. 41, Part 1, No. 10, pp. 6132-6136, Oct. 15, 2002.

(Continued)

*Primary Examiner*—Nimeshkumar D. Patel
*Assistant Examiner*—Anne M Hines
(74) *Attorney, Agent, or Firm*—Oblon, Spivak, McClelland, Maier & Neustadt, P.C.

(57) ABSTRACT

To provide a method of manufacturing a field emission display having an improved electron emission effect by means of laser irradiation and accordingly mitigating a luminance fluctuation among pixels, and other such techniques. Provided is a method of manufacturing a field emission display which includes a cathode substrate and a fluorescent screen glass opposed to the cathode substrate and emits light when an electron emitted from a carbon nanotube printed layer (7) containing a carbon nanotube of the cathode electrode enters a fluorescent material of the fluorescent screen glass, the method including a laser beam irradiation step of irradiating a surface of the carbon nanotube printed layer (7) with a laser beam having its energy density to be spatially modulated to expose and raise the carbon nanotube of the carbon nanotube printed layer so as to form a laser irradiation part (B) and a non-laser irradiation part (C).

11 Claims, 44 Drawing Sheets

U.S. PATENT DOCUMENTS

2004/0124756 A1* 7/2004 Lee et al. .................... 313/311
2005/0224764 A1* 10/2005 Ma et al. .................... 252/500

FOREIGN PATENT DOCUMENTS

| EP | 1069587 | 1/2001 |
| JP | 2000-36243 | 2/2000 |
| JP | 2002-373570 | 12/2002 |
| JP | 2004-22167 | 1/2004 |
| WO | WO03021624 | 2/2003 |

OTHER PUBLICATIONS

J.M. Kim "Studies of Full Color Field Emission Display Core Technologies With the Electrical and Structural Analysis" Applied Surface Science 146 (1999) pp. 209-216.

* cited by examiner

RELATIONSHIP BETWEEN BOUNDARY
LENGTH AND FLUCTUATION

MANUFACTURING METHOD FOR FIELD EMISSION DISPLAY

BACKGROUND OF THE INVENTION

1. Field of the Invention

The present invention relates to a manufacturing method and a designing method for a field emission display which performs display by emitting electrons from a cathode substrate to a fluorescent screen glass which are disposed in vacuum while opposing each other, in particular, a field emission display using a carbon nanotube for an electron emission area of a cathode substrate.

2. Description of the Related Art

A field emission display including a cathode substrate with a use of carbon nanotubes (CNTs) is a thin display offering features including a high luminance, a wide viewing angle, a long operating life, a fast response, and a low power consumption. A research and development for the field emission display is now being in progress for its practical use.

Similar to a cathode ray tube (CRT), field emission displays (FEDs) are displays utilizing light emission (fluorescence) generated when accelerated electrons collide with a fluorescent member. A major difference between the FED and the CRT resides in that the FED has a part equivalent of an electron gun miniaturized to be arranged to each pixel while the CRT displays an image by subjecting an electron beam emitted from a single electron gun to scanning with a deflection yoke.

The FED has such a structure that a cathode substrate including arrays of field emission type emitters for emitting electrons and an anode substrate including a fluorescent plane are arranged in vacuum while opposing each other. The cathode substrate includes gate lines and cathode lines orthogonal to the gate lines, and the emitter array is formed at each intersecting point of the lines. The emitter is generally processed to have a shape with its tip end being shapely pointed.

Field concentration occurs at the shapely pointed tip end where a strong field can be accordingly applied. When a solid surface has a strong field applied thereto, electrons confined on the solid surface are likely to fly out in vacuum owing to the tunnel effect, and then a phenomenon called field emission occurs. In the FED, light emission is generated when electrons leaving the emitters due to the field emission collide with the fluorescent member on the anode substrate.

Known as such a device is an electron emission source having an improved electron emission effect by printing a paste containing CNTs on a cathode electrode, irradiating the printed surface with a laser beam, and selectively removing substances excluding the CNTs to expose the CNTs (refer to JP 2000-36243 A, for example).

The field emission is a phenomenon where electrons present in a substance are emitted in vacuum passing through a potential barrier owing to the tunnel effect with an applied high level field while employing the fact that the field is likely to concentrate at a position having a sharply pointed tip end as described above. In general, it is more difficult to control an electron emission amount in field emission element than a thermal electron emission element because "uniform fabrication of plural field emission elements is hard since each tip end is extremely pointed", "a current density of field emission represented by the following Fowler-Nordheim equation has a higher sensitivity to the field than a current density of a thermal electron represented by the following Child-Langmuir equation", and the like.

Formula 1

Fowler-Nordheim equation:

$$j = aE^2 \exp\left(-\frac{b}{E}\right)$$

Wherein $j$ (A/cm$^2$) is a current density, $E$ (V/cm) is a field, and a and b are constants determined by a material and a geometric form of the emitter, respectively.

Child-Langmuir equation:

$$j = \frac{8}{9}\varepsilon_0 \sqrt{\frac{e}{2m}} \frac{V^{\frac{3}{2}}}{d^2}$$

Wherein $j$ (A/m$^2$) is a current density, $V$ (V) is an anode voltage, $d$ (m) is a distance between the cathode and the anode, $\varepsilon_0$ is the dielectric constant in vacuum, $e$ is the elementary charge, and $m$ is the electron mass.

For this reason, even when the emitter is expected to be fabricated in the same manner for each pixel in the FED, a slight difference in height and tip end curvature makes the electron amount generated from each emitter different upon application of the same voltage to the leading electrode. Thus, the luminosity among the pixels may fluctuate. In the case of the FED, it is unavoidable to some extent to use a driver circuit or the like to correct the luminosity fluctuation. However, if the fluctuation is at a low level, a circuit configuration etc. can be certainly simplified, which suppresses manufacturing costs.

On the other hand, as disclosed in JP 2000-36243 A, laser irradiation on the CNT printed layer removes components except the CNTs, making it possible to improve the electron emission efficiency. In JP 2000-36243 A, the electron gun for the CRT is supposed to function as an electron emission source. Electrons emitted from the single electron gun are subjected to scanning for irradiation to each pixel. Therefore, the luminosity fluctuation does not occur among the pixels. However, in the case of the FED, since each pixel is provided with an emitter as described above, it is necessary not only to improve the electron emission efficiency for each emitter, but also to make the electron amount generated from each emitter uniform and suppress the luminosity fluctuation among the pixel as much as possible. When laser irradiation for a wide area with a uniform energy density is carried out, a relatively uniform current can be obtained in view of comparison between wide areas. However, if areas each having a small area at a pixel level, e.g., about 0.2 mm×0.6 mm, are compared with each other, a large fluctuation occurs in their electron emission amounts based on a slight difference in laser irradiation results.

SUMMARY OF THE INVENTION

In view of the above-mentioned problems, it is therefore an object of the invention to provide a manufacturing method, a manufacturing apparatus, and a designing method for a field emission display using CNTs, the display having an enhanced electron emission efficiency and being improved in a luminosity fluctuation among pixels mainly owing to laser irradiation. The present invention also has an object to provide a manufacturing method, a manufacturing apparatus, and a designing method for the electron emission display.

The present invention provides, for example, a method of manufacturing a field emission display which includes a cathode substrate and a fluorescent screen glass opposed to the cathode substrate and which emits light when an electron emitted from a carbon nanotube printed layer containing a carbon nanotube of the cathode electrode enters a fluorescent material of the fluorescent screen glass, the method including a laser beam irradiation step of irradiating a surface of the carbon nanotube printed layer with a laser beam having its energy density to be spatially modulated.

According to the present invention, the surface of the CNT printed layer is irradiated with a laser beam having an energy density spatially modulated to expose the CNTs and form the raised part of the CNTs, making it possible to more efficiently and more uniformly expose and raise the CNTs. As a result, the electron emission efficiency is enhanced, and the luminosity fluctuation among the pixels is mitigated.

DETAILED DESCRIPTION OF THE PREFERRED EMBODIMENTS

Hereinafter, embodiments of the present invention will be described based on the accompanying drawings.

Embodiment 1

Figure 1:
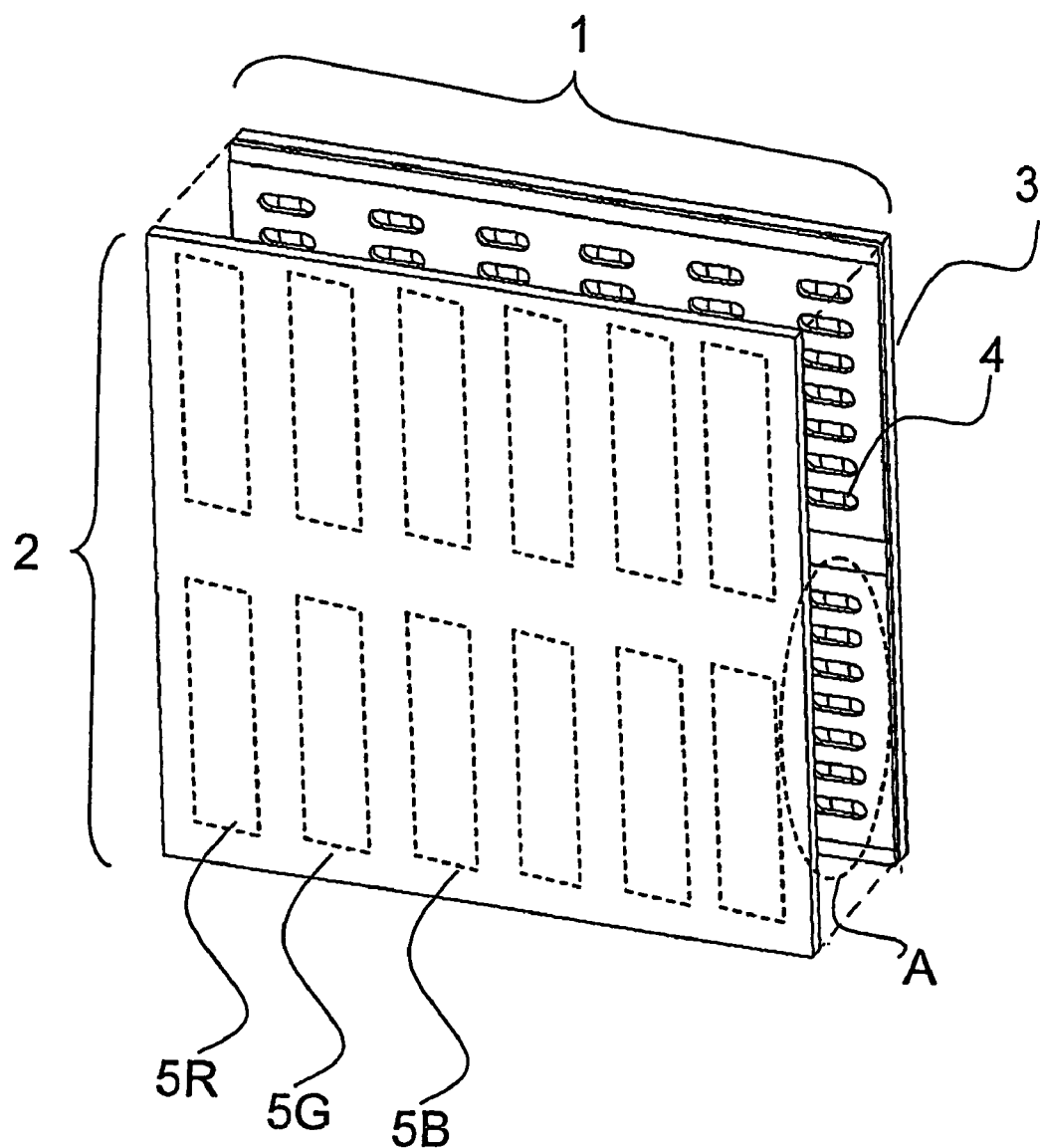
FIG. 1 is a perspective view showing a part of a field emission display according to Embodiment 1 of the present invention.

FIG. 1 is a perspective view schematically showing an example of a structure of a field emission display (FED) according to Embodiment 1 of the present invention. The FED of FIG. 1 includes a cathode substrate 1 and a fluorescent screen glass 2, which are disposed in vacuum while facing each other. The cathode substrate 1 is a substrate having an electron source composed of a carbon nanotube (CNT) printed layer 7 (which will be described later) on a glass plate 3 which serves as a substrate for the cathode substrate 1, and also has a large number of electron emission holes 4 serving as electron passage holes through which electrons are emitted. The fluorescent screen glass 2 is disposed away from the cathode substrate 1 at a certain distance while opposing thereto. A space defined between the fluorescent screen glass 2 and the cathode substrate 1 is kept in vacuum by means of a sealing structure (omitted in the drawing). The fluorescent screen glass 2 has a fluorescent member 5R for emitting red light (R), a fluorescent member 5G for emitting green light (G), and a fluorescent member 5B for emitting blue light (B) applied periodically on the cathode substrate 1 side.

In the FED, electrons passing through the electron emission holes (electron passage holes) 4 of the cathode substrate 1 due to field emission enter the fluorescent members 5R, 5G, and 5B to emit light, whereby an image is displayed. Each of the fluorescent members 5R, 5G, and 5B functions as a minimum unit called pixel or sub-pixel constituting an image (one group of the fluorescent members 5R, 5G, and 5B may be referred to as a pixel). In this embodiment, the size of one pixel is 150 μm×480 μm. As shown in the part A of FIG. 1, seven electron emission holes 4 are provided for one pixel. It should be noted that, the electron emission holes 4 are used upon laser irradiation to an upper surface of the CNT printed layer 7 as will be described below.

Figure 2:
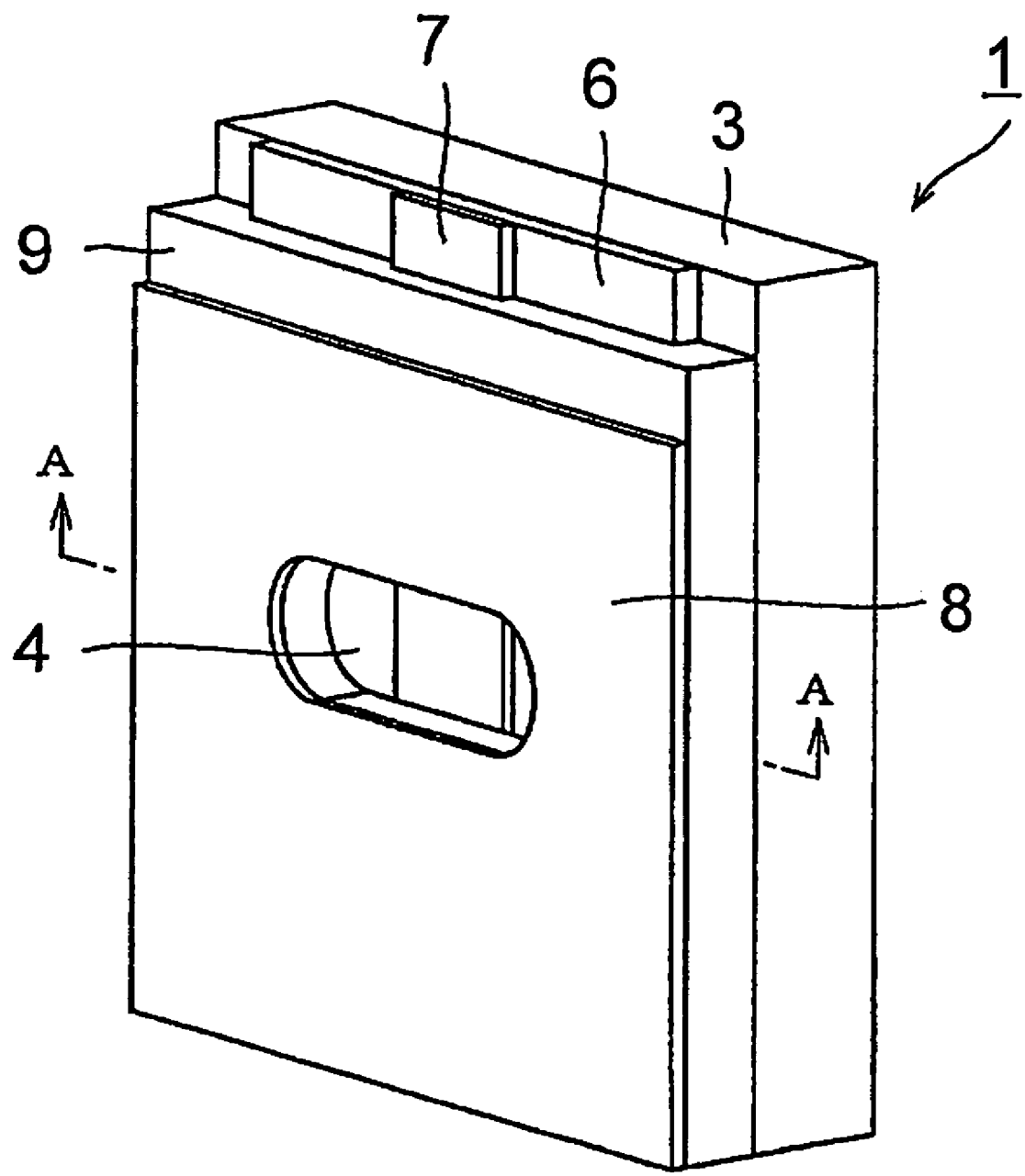
FIG. 2 is an enlarged perspective view showing the vicinity of an electron emission hole provided in the field emission display according to Embodiment 1 of the present invention.
Figure 3:
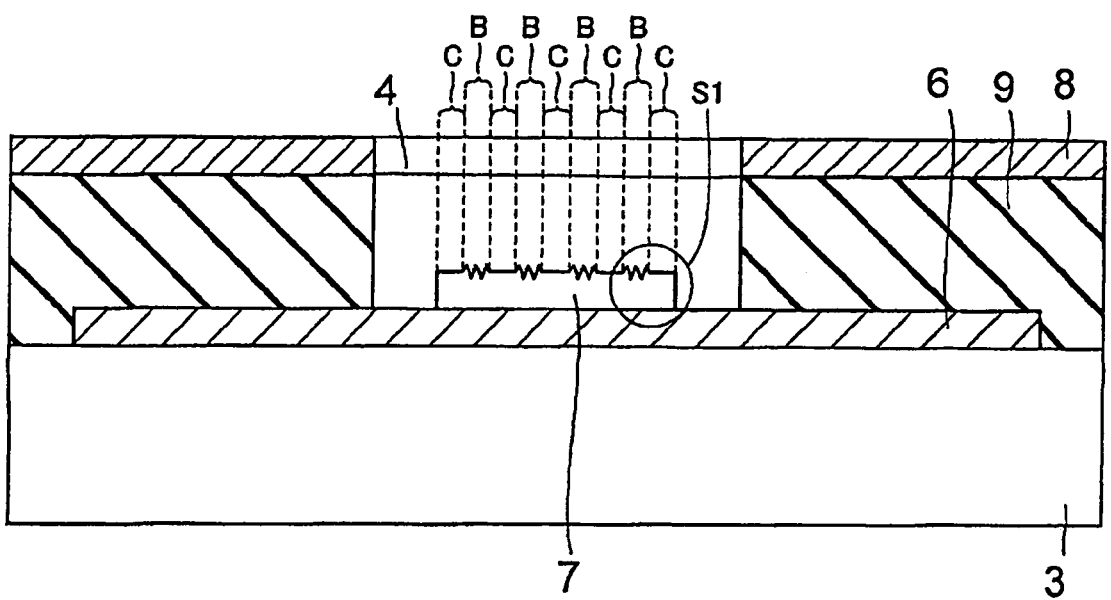
FIG. 3 is an enlarged sectional view showing the vicinity of the electron emission hole provided in the field emission display according to Embodiment 1 of the present invention.
Figure 4:
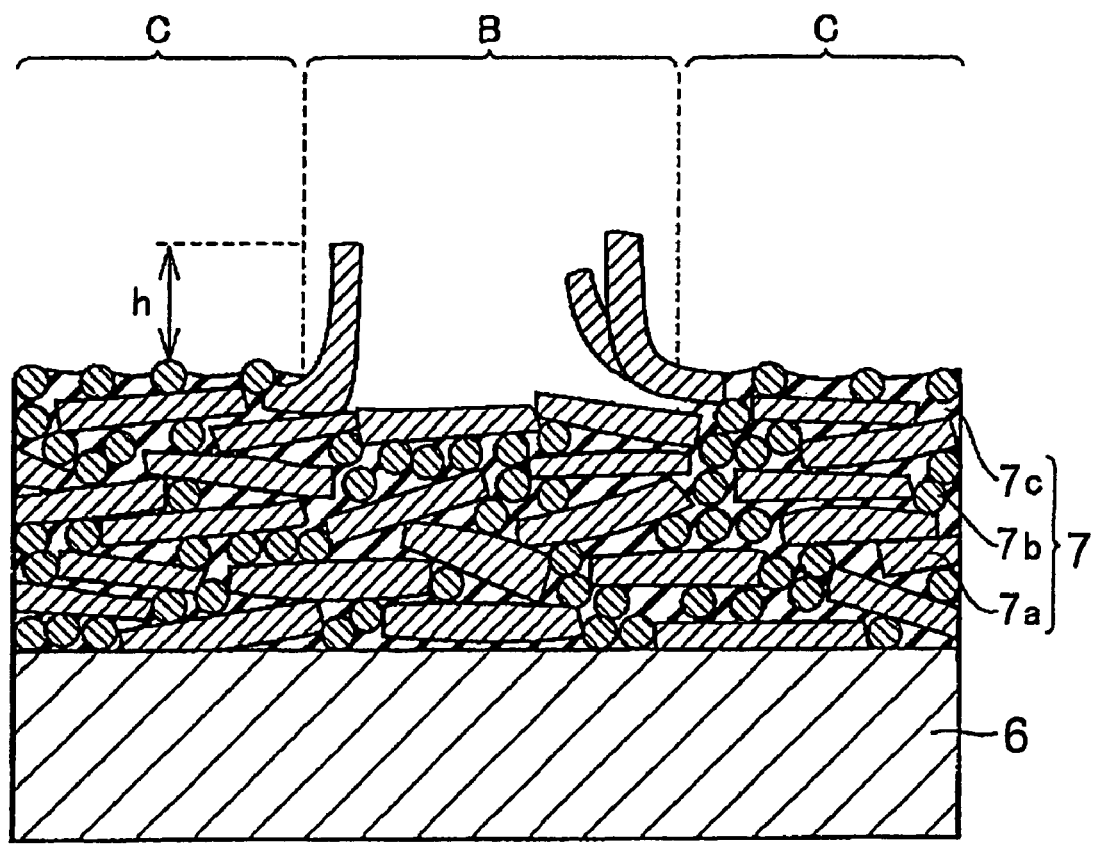
FIG. 4 is an enlarged sectional view showing the vicinity of a laser irradiation part of the field emission display according to Embodiment 1 of the present invention.

FIG. 2 is an enlarged perspective view showing the vicinity of one of the electron emission holes 4 in FIG. 1. FIG. 3 is a schematic sectional view along the line A-A of FIG. 2. FIG. 4 is a sectional view showing an area S1 of FIG. 3 in an enlarged manner.

Now, reference is mainly given with respect to FIG. 2. A cathode electrode 6 made of a metal thin film is formed on a main surface of the glass plate 3 (substrate). Printed on a surface of the cathode electrode 6 is the CNT printed layer 7 having a predetermined pattern formed through printing. The cathode electrode 6 is adapted to apply a predetermined voltage to the CNT of the CNT printed layer 7. Formed on the cathode electrode 6 through an insulating layer 9 is a leading electrode 8 so as to face the CNT printed layer 7. The leading electrode 8 and the insulating layer 9 have the electron emission hole 4 at a part of an area facing the CNT printed layer 7, and a part of the surface of the CNT printed layer 7 is exposed from the electron emission hole 4. A method shown in this embodiment where a minute hole is formed and a leading electrode is provided on an anode side of the emitter can perform uniform field application over the CNT printed layer surface, as compared with a method where a leading electrode is provided next to the emitter, that is, the CNT printed layer 7 in a planer manner. Therefore, the entirety of the CNT printed layer 7 can be efficiently utilized, and the number of emission sites (the number of raised CNT parts as will be described below) increases. As a result, the electron emission efficiency can be enhanced, and it is possible to mitigate the luminosity fluctuation among the pixels.

Reference is then mainly given with respect to FIG. 3. In a part where the CNT printed layer 7 is exposed from the electron emission hole 4, the CNT printed layer 7 has areas B where irradiated with a laser beam having an energy density equal to or higher than a predetermined threshold to form raised parts of the CNT (hereinafter, referred to as laser irradiation part or irradiation area) and areas C where irradiated with no laser beams or irradiated with a laser beam having an energy density lower than the predetermined threshold to form the raised CNT parts (hereinafter, referred to as non-laser irradiation part or non irradiation area).

While mainly referring to FIG. 4, the CNT printed layer 7 contains CNTs 7a, glass particles 7b, and a binder 7c. The glass particles 7b is partially melted, thereby increasing adhesiveness between the CNT printed layer 7 and the cathode electrode 6. The binder 7c is composed of fused glass particles or a residue produced resulting from mixture when the CNTs are formed into a paste.

In the non-laser irradiation part C, the CNTs 7a are embedded in the glass particles 7b and the binder 7c, and not so many CNTs 7a are exposed to the surface. In addition, a large number of the CNTs 7a are situated with their longitudinal directions kept in a horizontal direction. For this reason, even when the CNTs 7a are exposed to the surface, field concentration is unlikely to occur, and the electron emission efficiency is not satisfactory. On the other hand, in the laser irradiation part B, the CNTs 7a are exposed to the surface and further some of the CNTs 7a are curled up, forming raised parts of the CNTs 7a. In the non-laser irradiation part C, the CNTs 7a are formed in such a manner that the raised parts each have a height h (μm) equal to or higher than 3 μm from the upper surface of the CNT printed layer 7.

Figure 5:
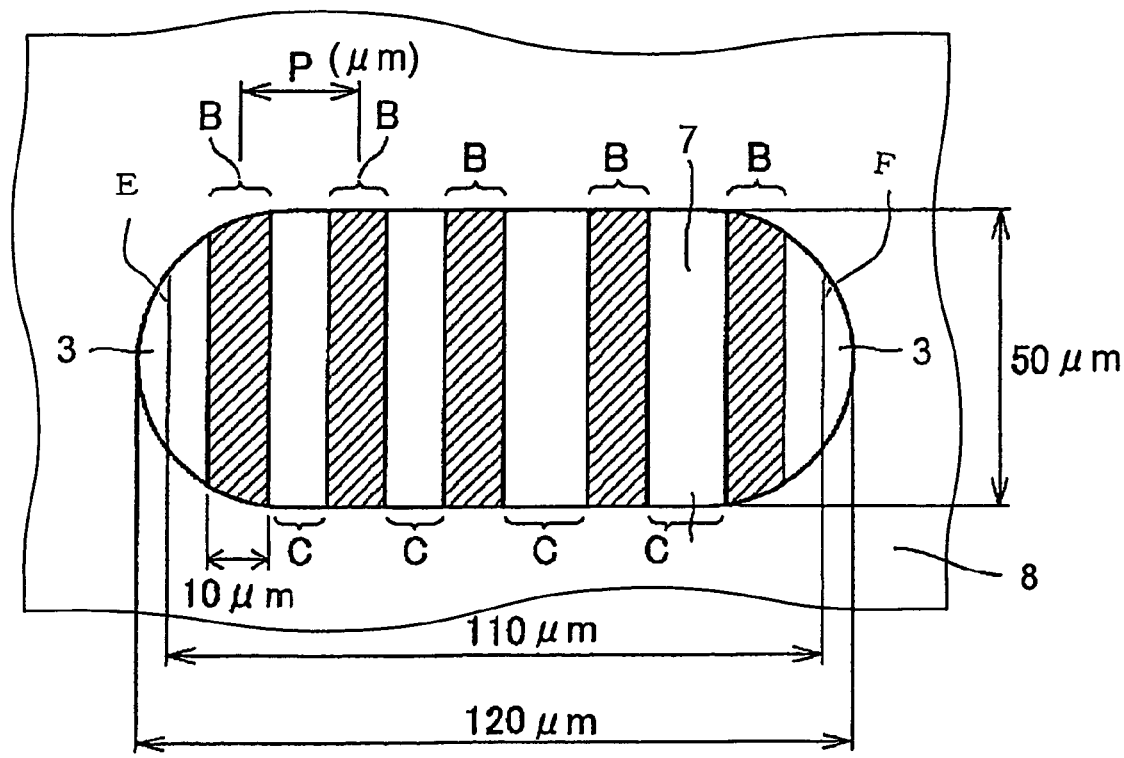
FIG. 5 is an enlarged plan view showing the vicinity of the electron emission hole, representing a laser irradiation pattern of the field emission display according to Embodiment 1 of the present invention.

FIG. 5 is an enlarged plan view showing one elongated circular electron emission hole 4, which represents a spatially modulated pattern of laser irradiation. In this embodiment, the length of a short side direction of the electron emission hole 4 is 50 μm, and the length of a long side direction thereof is 120 μm. The CNT printed layer 7 is formed in an area sandwiched by the line E and the line F, and the width of the CNT printed layer 7 is 110 μm. On the CNT printed layer 7, areas B indicate the laser irradiation parts and areas C indicate the non-laser irradiation parts. One laser irradiation part B has the width of 10 μm, and the laser irradiation parts B are arranged with a pitch P μm (120 μm, for instance), whereby stripes are attained.

In the FED according to this embodiment, a predetermined voltage is applied to the cathode electrode 6 and the leading electrode 8, causing a field on the surface of the CNT printed layer 7. At this time, the field concentrates at the CNTs 7a, electrons fly out from tip ends of the CNTs 7a owing to the tunnel effect, and so-called field electron emission occurs. The electrons flying out enter the fluorescent members 5R, 5G, and 5B of the fluorescent screen glass 2 and emit light, whereby an image is displayed.

Figure 6:
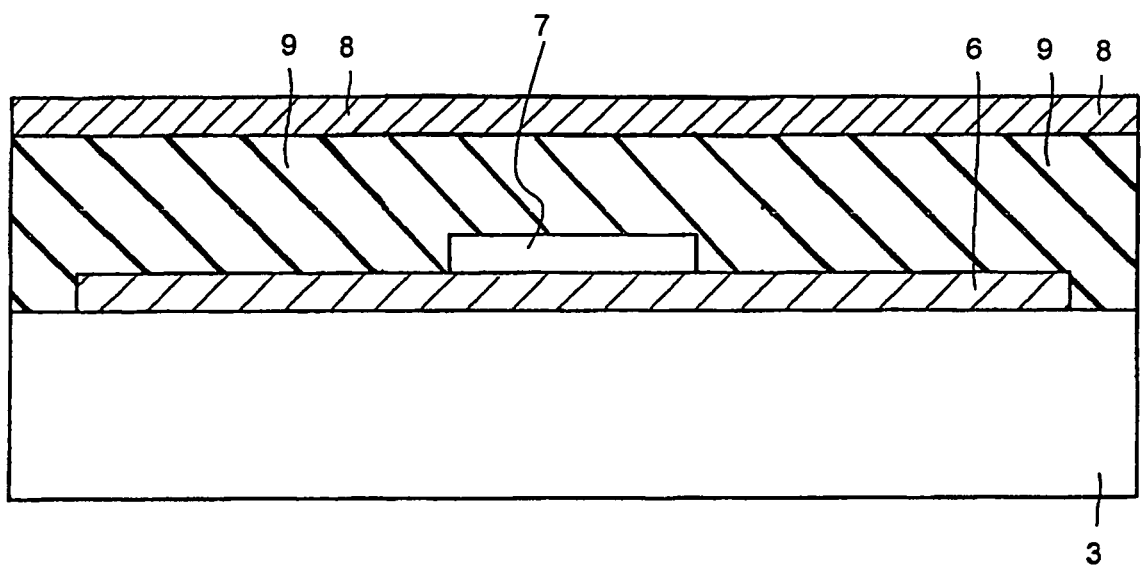
FIG. 6 is an enlarged sectional view showing a state after a leading electrode is formed, illustrative of a manufacturing process of the field emission display according to Embodiment 1 of the present invention.
Figure 7:
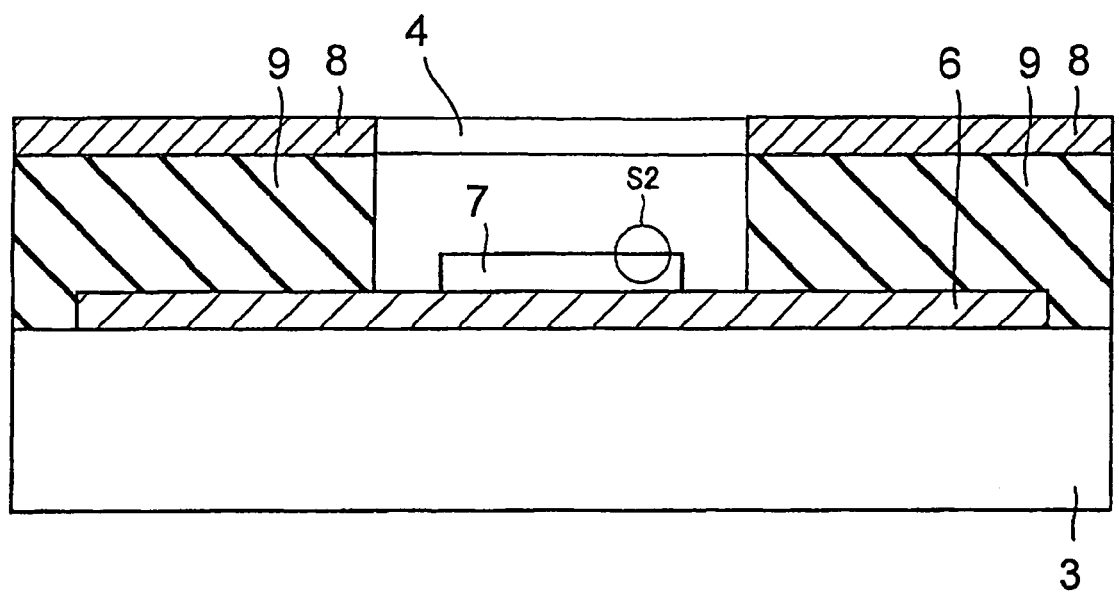
FIG. 7 is an enlarged sectional view showing a state after an electron emission hole is formed, illustrative of the manufacturing process of the field emission display according to Embodiment 1 of the present invention.
Figure 8:
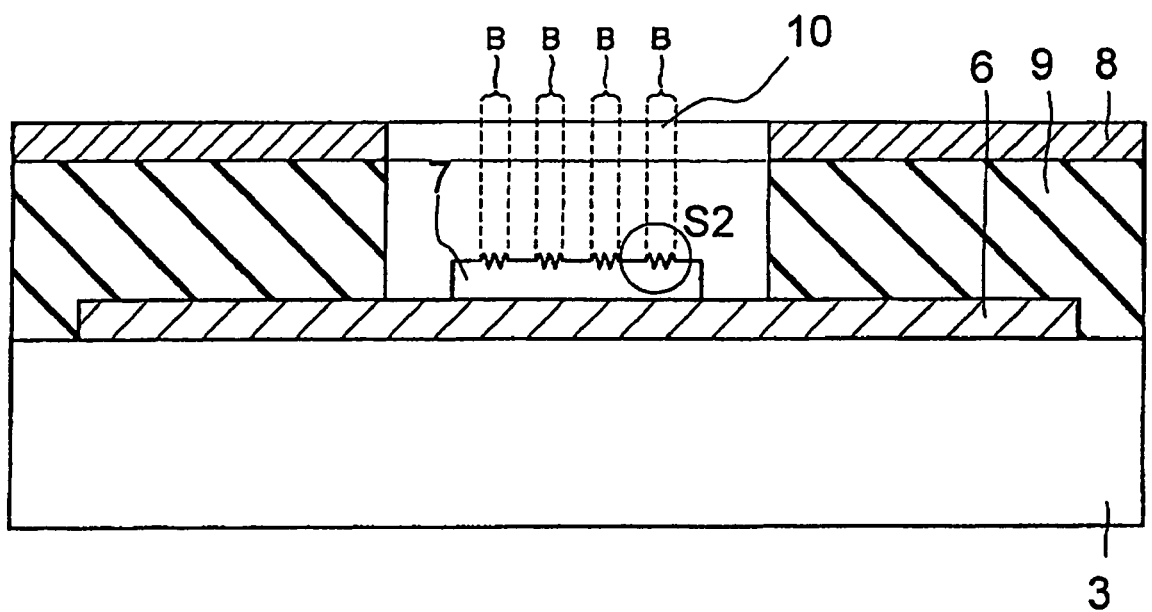
FIG. 8 is an enlarged sectional view showing a state after laser irradiation is carried out, illustrative of the manufacturing process of the field emission display according to Embodiment 1 of the present invention.

Next, a description will be made with respect to a manufacturing method for the FED according to this embodiment. FIGS. 6 to 8 are schematic sectional views showing the manufacturing method for the FED, in particular, on the cathode substrate side, in processing order according to Embodiment 1 of the present invention.

As shown in FIG. 6, the cathode electrode 6 made of a metal thin film is formed on a surface of the glass substrate 3. Formed on a surface of the cathode electrode 6 is the CNT printed layer 7 through printing. In this printing, a paste containing CNTs, glass fine particles, a resin, a dispersant, a solvent, and the like is applied on the surface of the cathode electrode 6 with a predetermined pattern. The insulating layer 9 is formed on a surface of the applied surface. Further, the leading electrode 8 is formed on the insulating layer 9 with a predetermined pattern. After that, as shown in FIG. 7, the electron emission hole 4 is formed by etching with a predetermined pattern, whereby a part of the CNT printed layer 7 is exposed. Then, baking is performed while heating at a temperature such that the glass fine particles are slightly fused, and a majority of the resin and the dispersant disappears. At the same time, the glass fine particles, which are once fused, are solidified again, whereby the adhesiveness between the CNT printed layer 7 and the cathode electrode 6 is enhanced.

Figure 9:
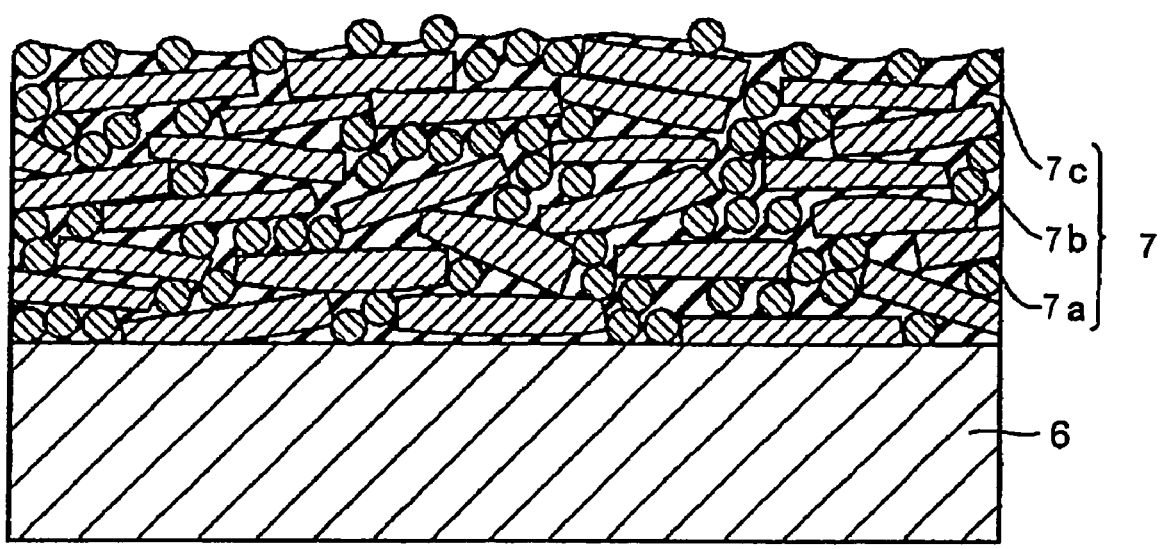
FIG. 9 is an enlarged sectional view showing a surface state of a CNT printed layer before laser irradiation is carried out, which is included in the field emission display according to Embodiment 1 of the present invention.

In an area S2 in this state, as shown in an enlarged sectional diagram of FIG. 9, almost all the CNTs 7a are covered with substances excepting for the CNTs (the glass particles 7b, the binder 7c, and the like). For this reason, in general, a satisfactory emission characteristic cannot be obtained from the CNT printed layer 7 as they are merely printed.

As shown in FIG. 8, the surface of the CNT printed layer 7, which is exposed through the electron emission holes 4, is irradiated with a laser beam 10. In the area S2 after the laser irradiation, as shown in the enlarged sectional view of FIG. 4, the CNTs 7a are curled up and raised to be exposed by means of the laser irradiation. For this reason, the emission characteristic is improved because the raised parts of the CNTs 7a facilitate the generation of field concentration. At this time, as described in JP 2000-36243 A, if not only the CNTs are exposed but also the CNTs are curled up to have raised parts thereof with a height, the generation of field concentration is further facilitated, and the electron emission efficiency can be enhanced.

Figure 10:
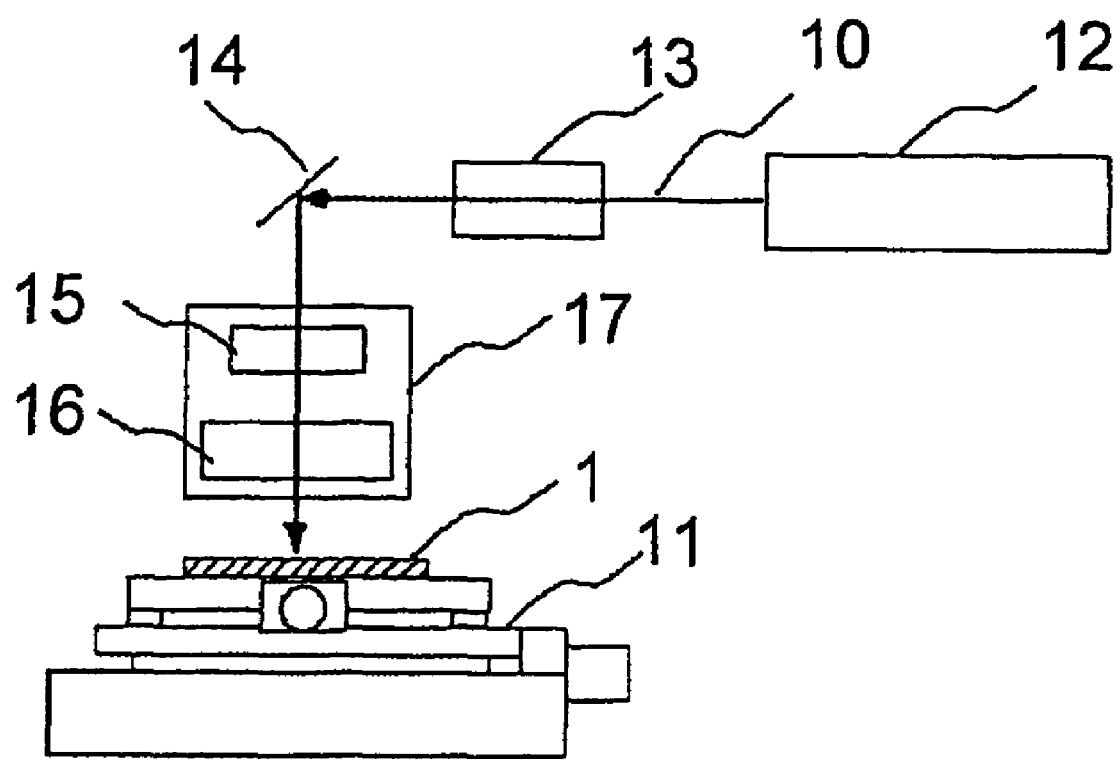
FIG. 10 is a construction diagram of a manufacturing apparatus for carrying out laser irradiation on the field emission display according to Embodiment 1 of the present invention.

Shown in FIG. 10 is a structure of a manufacturing apparatus according to this embodiment, which carries out the above-mentioned laser irradiation. The cathode substrate 1 having the CNT printed layer 7 formed thereon is disposed and fixed on an XY axis driving apparatus 11. The laser beam 10 emitted from a laser oscillator 12 passes through a collimation optical system 13, a reflecting mirror 14, and an electron emission area processing mask 15 to be converged at a convergent lens 16. After that, the cathode substrate 1 is irradiated with the converged laser beam. The electron emission area processing mask 15 and the convergent lens 16 are driven by a Z axis driving apparatus 17, and focus adjustment of the laser beam is performed on the cathode substrate 1.

Figure 11:
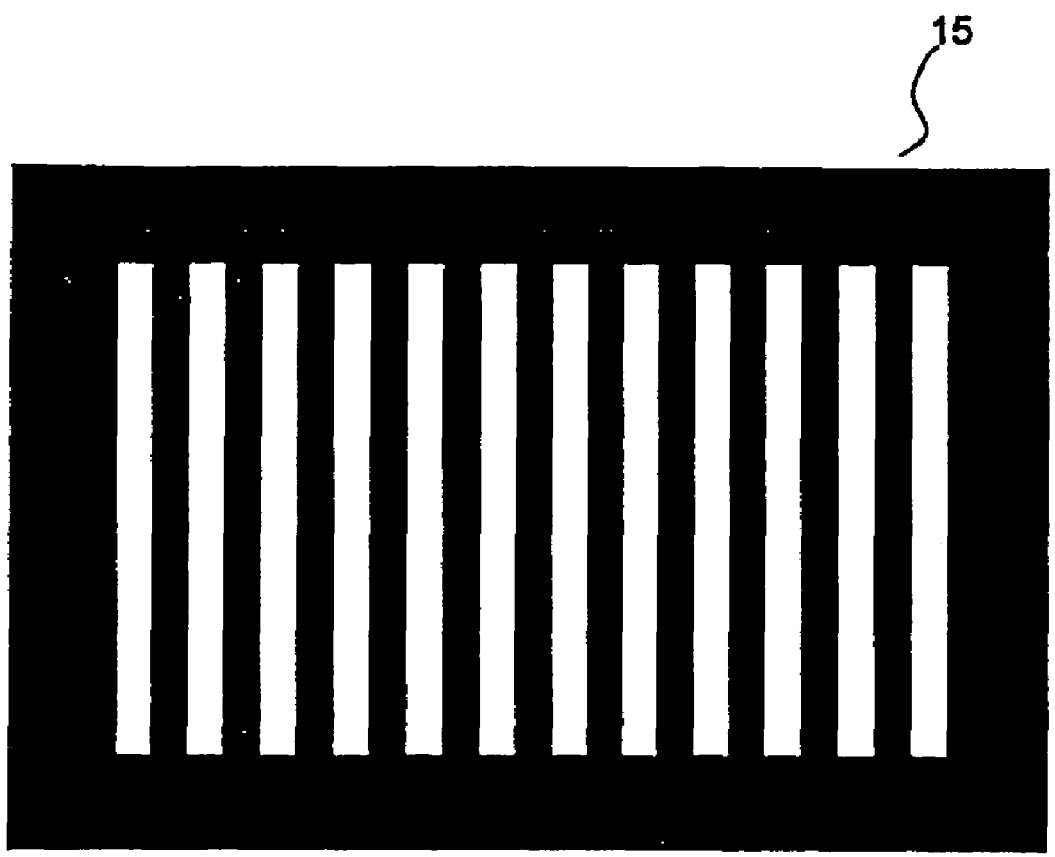
FIG. 11 is an enlarged plan view showing a mask for an electron emission area processing of the manufacturing apparatus for carrying out laser irradiation on the field emission display according to Embodiment 1 of the present invention.

FIG. 11 shows an example of a mask pattern for the electron emission area processing mask 15 for carrying out spatially modulated laser irradiation (hereinafter, referred to as pattern irradiation) on the CNT printed layer 7 functioning as the electron emission area according to this embodiment. The pattern on the mask of FIG. 11 is formed in consideration of a transfer rate resulting from the convergent lens 16. According to this embodiment, the transfer rate is one tenth so that the pattern on the electron emission area processing mask 15 is formed to be ten times larger than the pattern on the CNT printed layer 7. By thus employing a reduction transfer system, the pattern of the electron emission area processing mask 15 becomes larger than the pattern on the CNT printed layer 7. Therefore, fabrication of the electron emission area processing mask 15 is facilitated. In addition, an energy density of the laser beam on the electron emission area processing mask 15 surface becomes smaller than an energy density of the laser beam on the CNT printed layer 7 surface, which reduces the load on the electron emission area processing mask 15.

Further, all optical components can be arranged away from the cathode substrate, thus suppressing an influence of the substance allowed to fly out when laser irradiation is carried out. To carry out laser irradiation with a pattern shown in FIG. 5, it is conceivable to perform scanning of a laser beam having a linear energy density profile for line by line for irradiation. However, by employing the manufacturing apparatus according to this embodiment, it is unnecessary to repeat movement of the laser beam for irradiation. Therefore, the irradiation with a very fine pattern can be performed for a wide area at the same time, and the irradiation efficiency is promoted.

It should be noted that, when the area to be covered with one-time irradiation is larger than the cathode substrate 1, it is possible to perform processing for the entire surface of the cathode substrate 1 by carrying out laser irradiation one time. On the other hand, when the area to be covered with one-time irradiation is smaller than the cathode substrate 1, the position feed of the cathode substrate 1 is repeated by the XY axis driving apparatus 11 and the laser irradiation is carried out plural times to perform the pattern irradiation on the entire surface of the cathode substrate 1. At this time, the leading electrode 8 is also irradiated with the laser beam. According to this embodiment, no problems occur since the leading electrode 8 is made of a material which is not damaged even when irradiated with the laser beam having a predetermined energy density or made of a material subjected to processing as will be described below.

Figure 12:
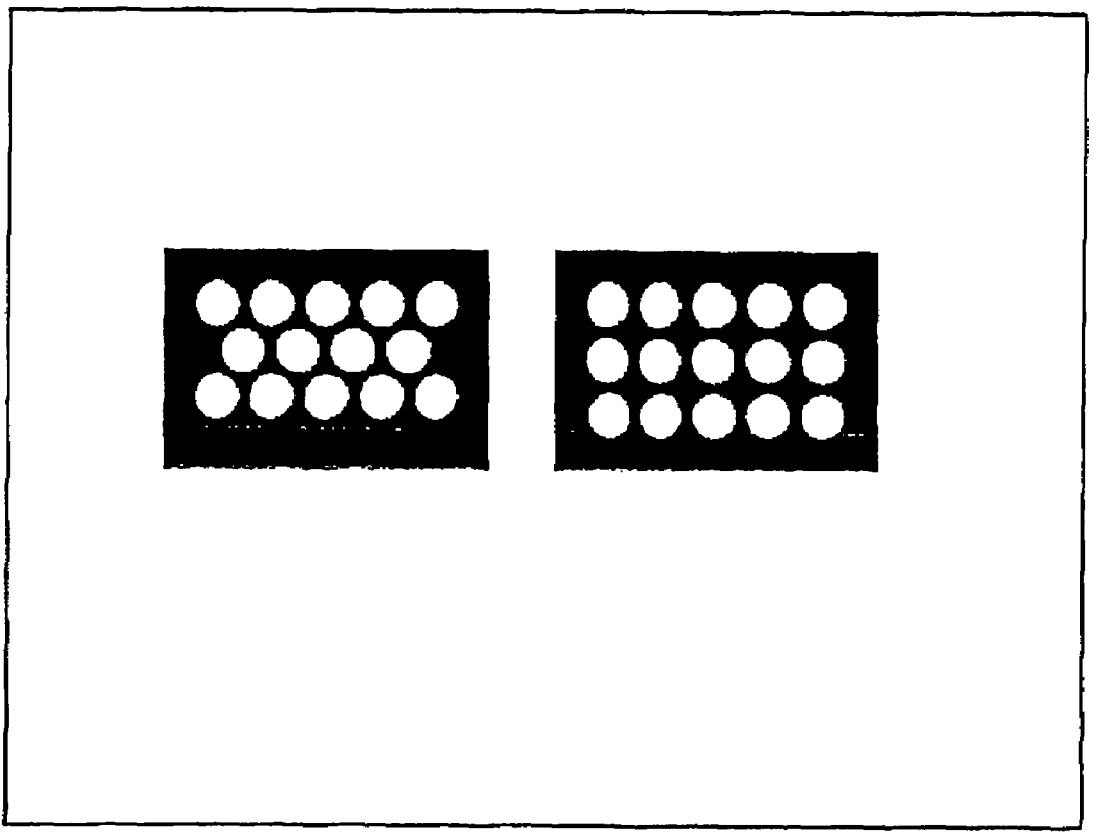
FIG. 12 is an enlarged plan view showing other masks for an electron emission area processing of the manufacturing apparatus for carrying out laser irradiation on the field emission display according to Embodiment 1 of the present invention.

FIG. 12 shows examples of a mask pattern of the electron emission area processing mask 15 for carrying out irradiation with dot-shaped spots, in one of which each spot is arranged at the apex of a regular triangle and in the other of which each spot is arranged at the apex of a square.

The electron emission characteristic from the CNT printed layer 7 in the cathode substrate 1 is not regulated by the turn-on field alone, but herein the electron emission characteristic of one pixel is represented by a value of the turn-on field. The turn-on field means a value of field at which an electron is started to be emitted. As the turn-on field is smaller, the electron emission characteristic is more satisfactory. According to this embodiment, its definition is made by a value of field at which a current density of 0.1 mA/cm$^2$ is obtained. Then, the field is a value obtained by dividing a potential difference between the leading electrode 8 and the cathode electrode 6 by a distance between the leading electrode 8 and the cathode electrode 6. The electron emission characteristic fluctuation is similarly represented by the turn-on field fluctuation. A fluctuation σ of the turn-on fields is defined by a value obtained by dividing the turn-on field standard deviation by an average value of the turn-on fields and expressing the resultant in percentage. Then, the boundary length L (μm) between the laser irradiation part B and the non-laser irradiation part C is a value obtained by summing up the boundary lengths for each pixel between the laser irradiation part B and the non-laser irradiation part C. When one pixel is structured by seven electron emission holes 4 as shown FIG. 1, the boundary length L is a sum of the boundary lengths of the CNT printed layer 7 exposed from each of the seven electron emission holes 4. A raised part height h is an average value of the heights of the CNTs 7a, which may serve as main electron emission points for the CNTs 7a. To be specific, the value is obtained by: finding the height of the highest raised part of the CNTs for each boundary length; and calculating an average of the thus found heights. To find the height of the main emission site, the boundary length for sampling needs to be made several times larger or more than the height of the highly raised part of the CNTs, and allowed to perform sampling at least several times per pixel. According to this embodiment, the boundary length for sampling is set to 100 μm.

The laser irradiation according to the above manufacturing method is carried out so that a relationship between the boundary length L (μm) between the laser irradiation part B and the non-laser irradiation part C and a set value of the turn-on voltage fluctuation σ (%) satisfies a formula of L≧7.2×10$^4$/σ$^2$, and the boundary length per mm$^2$ is set to 10$^6$/h (μm) or smaller, when h (μm) is a set value of the raised part of the CNTs 7a in the laser irradiation part B.

After that, as shown in FIG. 1, the fluorescent screen glass 2 having the fluorescent members 5R, 5G, and 5B applied thereon is disposed spaced apart from the cathode substrate 6 while opposing thereto, and sealed in vacuum, whereby the FED according to this embodiment is manufactured.

Next, a description will be given with respect to tests conducted by the inventors of the present invention. In this embodiment, the set value of the turn-on voltage fluctuation is 6%. The boundary length L (μm) for one pixel between the laser irradiation part B and the non-laser irradiation part C is about 4000 μm in the case where the pitch P=20 μm. Regarding the turn-on field fluctuation, a relationship between the boundary length L (μm) between the laser irradiation part B and the non-laser irradiation part C and the set value of the turn-on voltage fluctuation σ (%) satisfies a formula of L≧7.2×10$^4$/σ$^2$. Then, in the laser irradiation part B, a measured value h of a height of the raised part of the CNTs 7a is about 3 μm, and the boundary length per mm$^2$ is 10$^6$/h (μm) or smaller.

Figure 13:
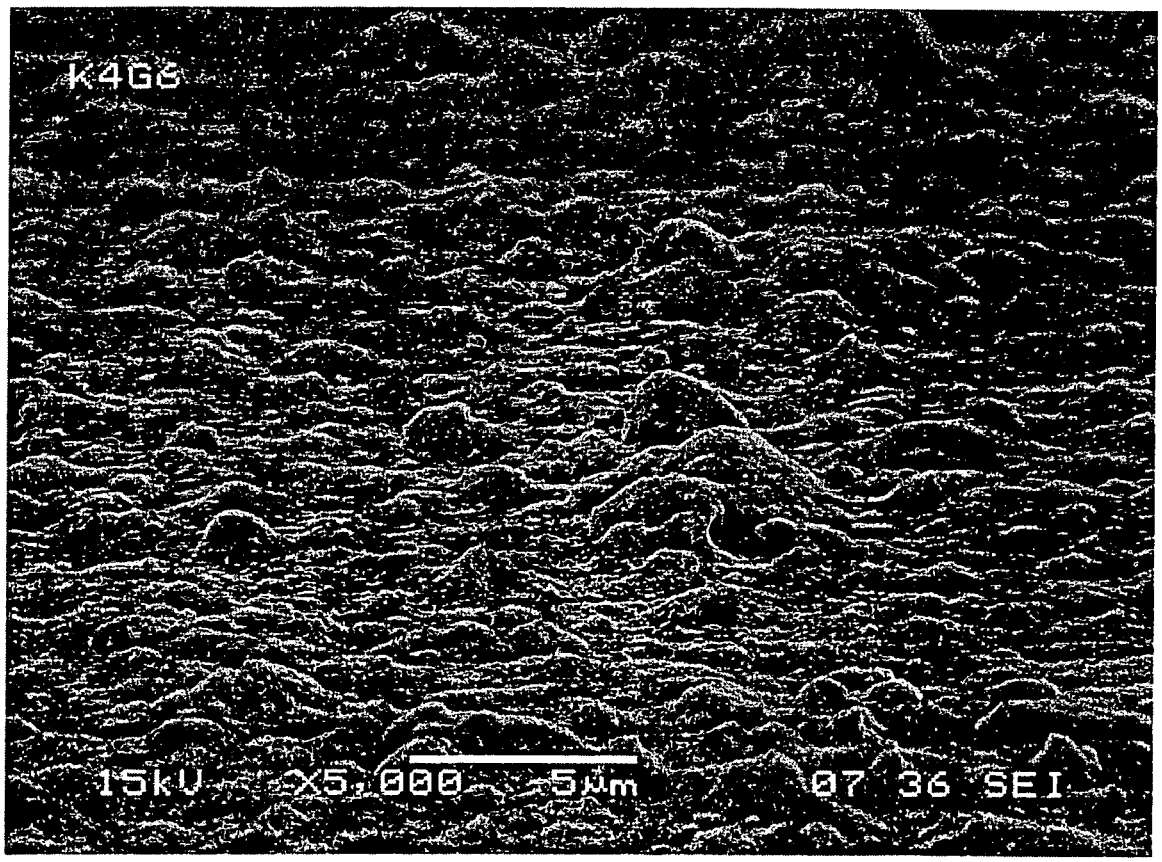
FIG. 13 is an electron micrograph showing a surface state of the CNT printed layer before laser irradiation is carried out, which is included in the field emission display according to Embodiment 1 of the present invention.

In the step shown in FIG. 7 during the manufacture, that is, when a surface of the CNT printed layer 7 shown in the area S2 before the laser irradiation is observed with a scanning electron microscope (SEM), as shown in an SEM photograph of FIG. 13, the CNTs are embedded in the CNT printed layer 7, and do not protrude from the surface.

Figure 14:
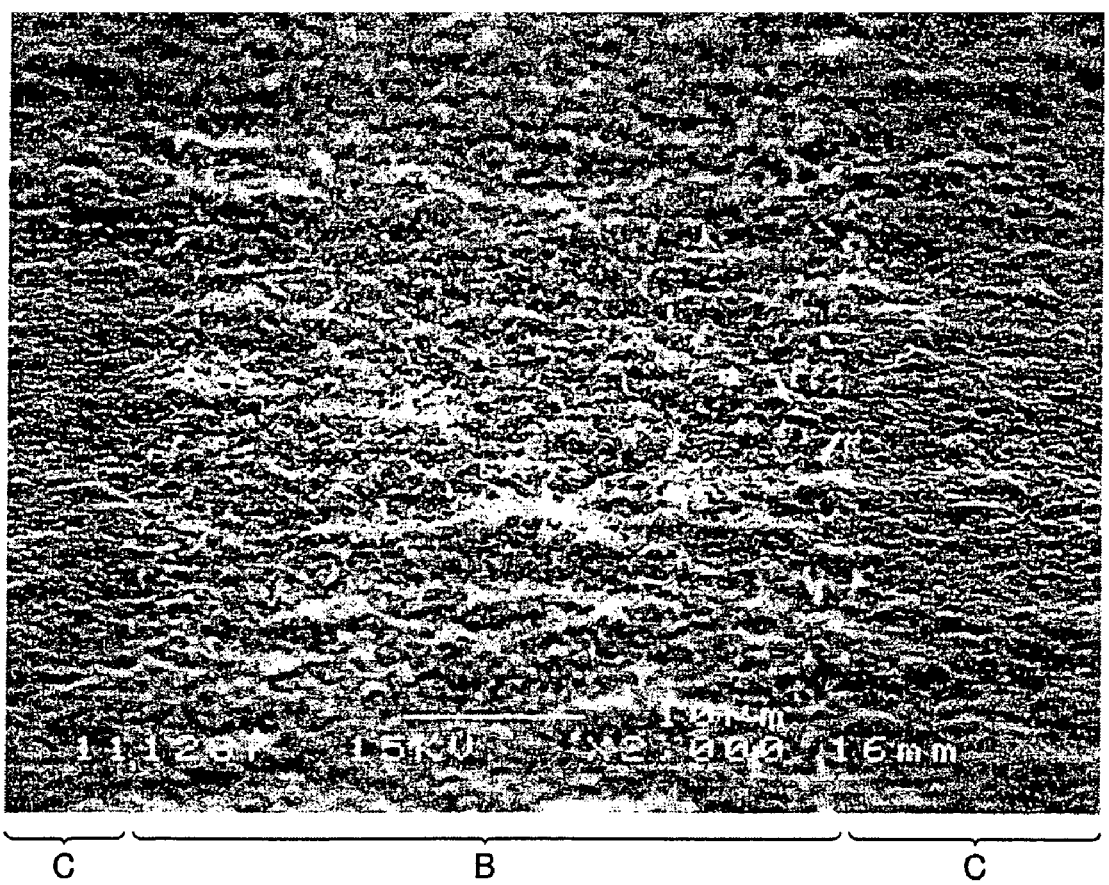
FIG. 14 is an electron micrograph showing a surface state of the CNT printed layer after laser irradiation is carried out in an experiment related to Embodiment 1 of the present invention.
Figure 15:
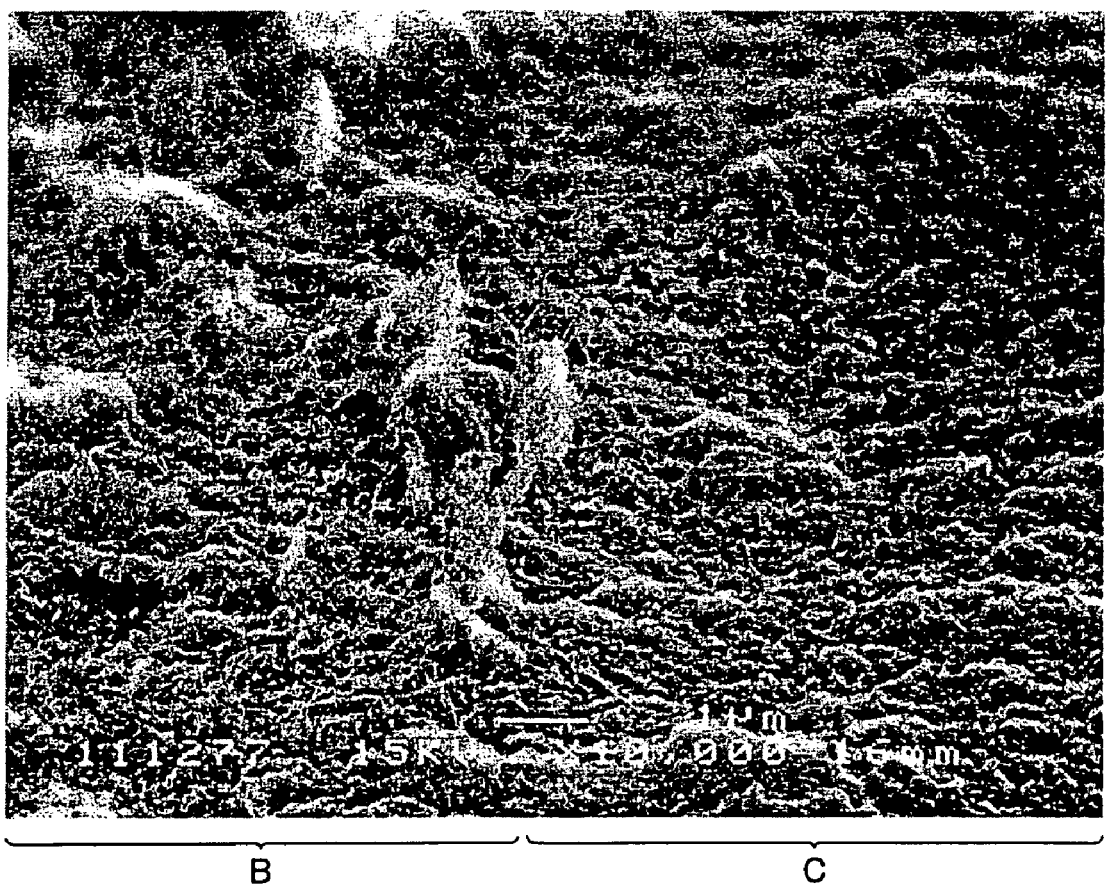
FIG. 15 is a higher-powered electron micrograph showing the surface state of the CNT printed layer after laser irradiation is carried out in an experiment related to Embodiment 1 of the present invention.

Further, in the step shown in FIG. 8, that is, when the surface of the CNT printed layer 7 shown in the area S2 after the laser irradiation is observed with the scanning electron microscope (SEM), as shown in an SEM photograph of FIG. 14 with the magnification of 2,000 times and an SEM photograph of FIG. 15 with the magnification of 10,000 times, the CNTs are curled up from the CNT printed layer 7 in the laser irradiation parts C.

To improve the electron emission efficiency, it is preferable that the electron emission amount from one electron emission point be large, and further the number of the electron emission points be large making it advantageous to obtain a large number of the highly raised parts of the CNTs. As shown in FIGS. 14 and 15, it is understood that the highest raised parts as well as the largest number of the raised parts of the CNTs exist at a boundary between the laser irradiation part B and the non-laser irradiation part C. Upon laser irradiation, the CNTs 7a fly together with the glass particles 7b and the binder 7c. However, in the case where adhesiveness of the CNTs to the surface is stronger than the force allowing the flying out, the CNTs 7a stay at the surface. The adhesiveness is large on a side where the laser irradiation is not carried out at the boundary. A large number of the highly raised parts of the CNTs are generated at the boundary because the CNTs 7a about to fly are easily to stay at the surface. Therefore, the boundary should be set long in order to obtain many raised CNT parts. If the entirety of the CNT printed layer 7 is uniformly irradiated with a laser beam, for example, if the laser irradiation is carried out with a rectangular shape for each pixel, the boundary length between the laser irradiation part B and the non-laser irradiation part C becomes small, and the number of the exposed CNTs cannot be efficiently increased. Thus, the number of the electron emission points cannot be efficiently increased.

Figure 16:
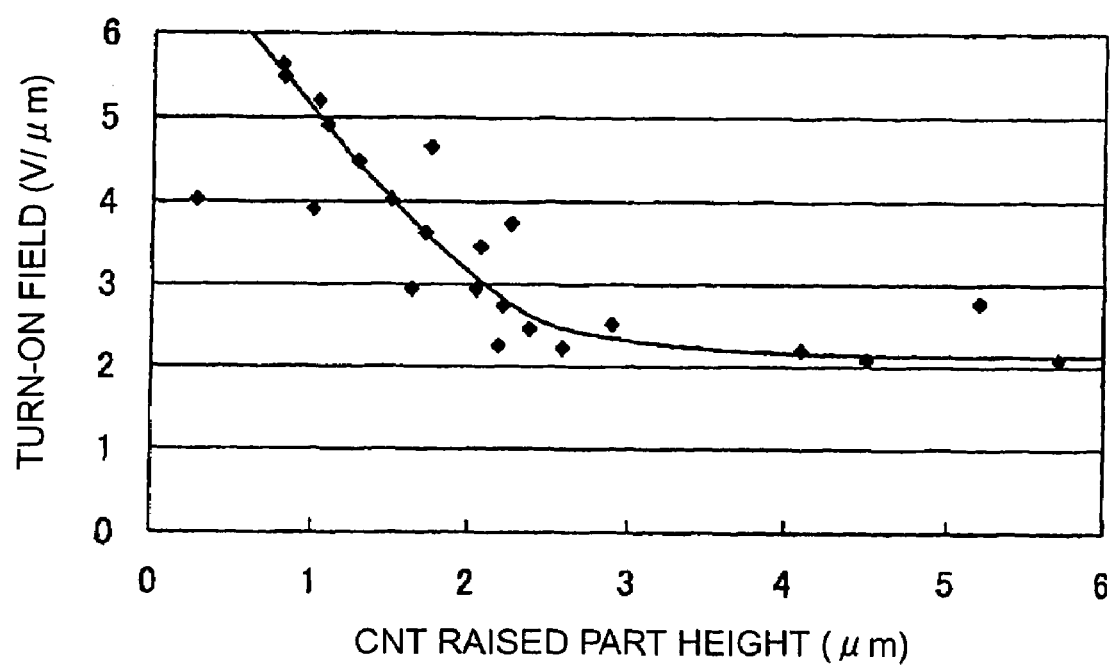
FIG. 16 is a graph representing a relationship between a height of a raised part of CNTs and a turn-on field in an experiment related to Embodiment 1 of the present invention.

FIG. 16 is a graph representing measurements of the relationship between the heights of the raised CNT parts and the turn-on field. Based on FIG. 16, as the CNTs are more highly raised, the turn-on field becomes smaller. When the raised part heights are as high as about 2 μm, it is possible to set the turn-on voltage low effectively, and thus the raised part heights are preferably 2 μm or higher. More preferably, the raised part heights are 3 μm or higher.

A preferable range of the raised part heights is from 3 μm to 10 μm. With reference to FIG. 16, the lower limit of 3 μm is set because up to 3 μm, the turn-on field can be lowered effectively. If the value is 3 μm or larger, there is a saturation tendency. With regard to the upper limit, since the method is employed in which the CNTs on the surface are curled up by means of the laser irradiation, it is impossible to form raised CNT parts with a height larger than a length of the area where the CNTs are exposed in the electron emission hole in principal. In addition, it is difficult to form the raised CNT parts with a height of 7 μm or higher, in particular, 10 μm or higher with stability in practical. In view of the above circumstances, the upper limit is set to 10 μm.

Figure 17:
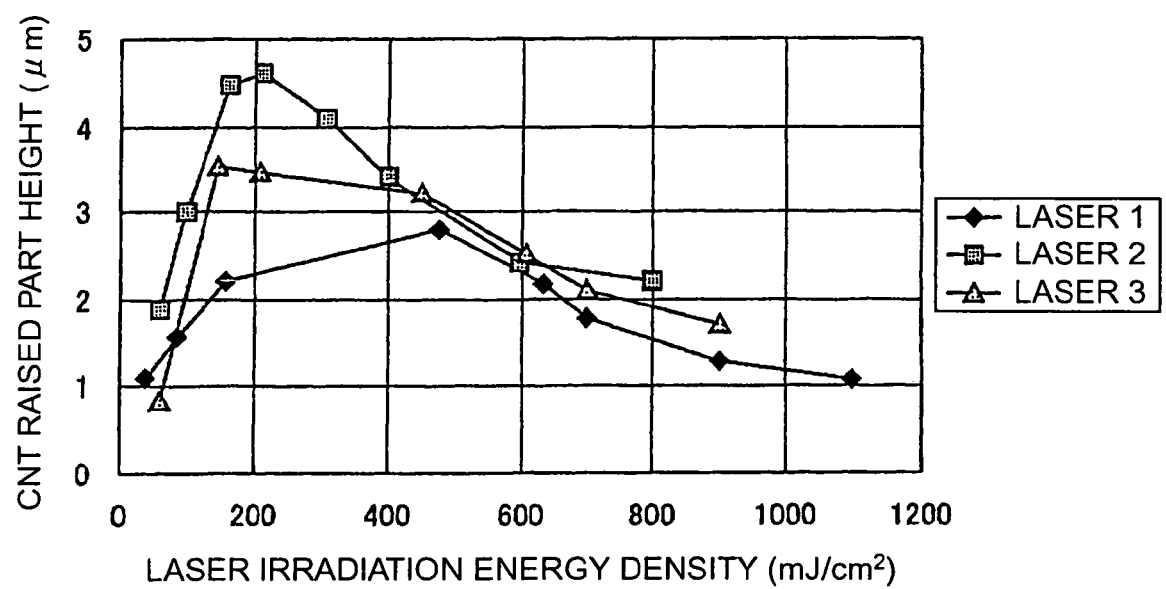
FIG. 17 is a graph representing a relationship between an energy density of laser irradiation and a height of a raised part of CNTs in an experiment related to Embodiment 1 of the present invention.

FIG. 17 is a graph representing measurements of the relationship between the energy density of the laser irradiation and the raised part height of the CNTs. This experiment is performed with three lasers with different wavelengths. With a use of any laser, if the energy density of the laser irradiation is too small, the heights of the exposure and the raised part of the CNTs are low. On the other hand, if the energy density of the laser irradiation is too large, some areas have extremely raised parts but the heights of the exposure are low on an average. As shown in FIG. 17, when the laser power is set to 50 to 1000 (mJ/cm$^2$), more preferably, 100 to 500 mJ/cm$^2$, the heights of the raised parts can be controlled with stability. The upper limit allowing the stable formation of the raised parts is about 7 μm.

The laser energy density preferably falls within a range from 100 (mJ/cm$^2$) to 500 (mJ/cm$^2$). This is because, while referring to FIG. 17, the electron emission characteristic is sufficiently satisfactory and the fluctuation can be mitigated since the raised CNT part heights can be relatively stably controlled as high as 3 μm or higher.

In view of the above results, in this embodiment, from now on, a case will be described where the laser irradiation power is set to 270 mJ/cm$^2$, and the height of the raised CNT part is set to about 3 μm.

According to this embodiment, as shown in FIG. 5, the size of the electron emission holes 4 on the short side direction is set to 50 μm, the size thereof in the long side direction is set to 120 μm, the line width of the CNT printed layer 7 is set to 110 μm, and the width of one laser irradiation part B (hatching part) is set to 10 μm. Then, the pitch P of the laser irradiation parts B is set to several variations for the purpose of changing the boundary length L.

Figure 18:
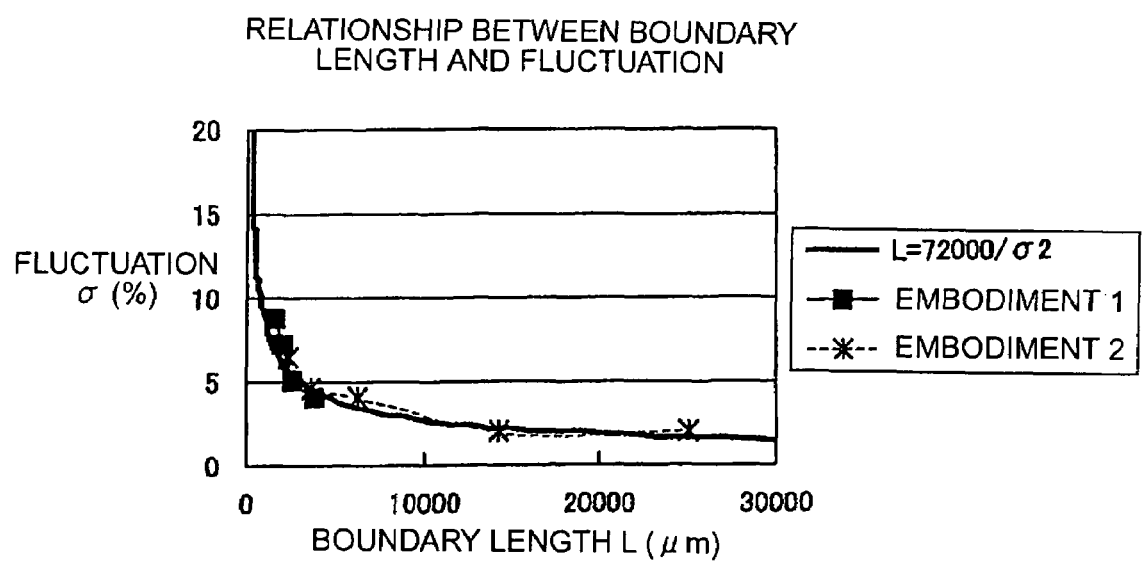
FIG. 18 is a graph representing a relationship between a boundary length and a fluctuation in turn-on field in an experiment related to Embodiments 1 and 2 of the present invention.

The turn-on voltage is measured for each pixel in the respective samples having different pitches. FIG. 18 is a graph representing a relationship between the boundary length L and the turn-on voltage fluctuation σ obtained from the experiment. From the measurement, it is understood that plots obtained in FIG. 18 are generally approximated by a formula shown below.

Formula 2

$$\sigma = (7.2 \times 10^4 / L)^{1/2} \quad (1)$$

From the formula (1), with respect to the allowable fluctuation σ from the viewpoints of circuit ability or the like, if the boundary length L is set as in the following formula (2), the fluctuation can be suppressed in a permissible extent. With respect to the formula (2) as well, it is expected that a value of an actual number be slightly changed based on the quality or the shape of the CNTs, etc. To mitigate the fluctuation σ, the boundary length L between the laser irradiation parts and the non-laser irradiation parts needs to be large. The boundary length basically required is not different in that the length is in inverse proportion to the square of the permissible fluctuation.

Formula 3

$$L \geq 7.2 \times 10^4 / \sigma^2 \quad (2)$$

As has been described above, the boundary length L between the laser irradiation parts and the non-laser irradiation parts is set as in the formula (2), and therefore the fluctuation σ can be set in the permissible range. In addition, by setting the height of the exposed CNT to 2 μm, more preferably, 3 μm or higher, it is possible to mitigate the fluctuation σ while the satisfactory emission characteristic being attained.

Further, as described above, basically, as the boundary length L is larger, the suppressing effect for the fluctuation σ becomes larger. However, if the boundary length L is too large, the tip ends of the CNTs aggregate. Thus, the field concentration hardly occurs, and the turn-on voltage becomes high. If the gap substantially corresponding to the raised CNT part height is provided in arrangement, this phenomenon is significantly suppressed. Therefore, the boundary length L needs to keep this gap, and the boundary length L has the upper limit. As in this embodiment, in the case where the stripe pattern is used, the density of the boundary per unit area has an upper limit of $10^6/h$ (μm/mm$^2$) when the raised CNT part height is represented by h, the setting is made using the value not larger than $10^6/h$ (μm/mm$^2$).

It should be noted that a case is described where the laser irradiation in a stripe pattern is carried out in this embodiment. If the necessary boundary length can be secured, laser irradiation in another pattern, for example, a pattern with a large number of dots may be carried out. In this case as well, the upper limit exist regarding the boundary length L. Even when hexagonal close-packed lattice arrangement is employed, the upper limit is about $10^6/h$ (μm/mm$^2$), the setting is made using the value not larger than $10^6/h$ (μm/mm$^2$).

According to this embodiment, in the laser irradiation, as described above, spatially modulated laser is used for the laser irradiation such that the relationship between the boundary length L between the laser irradiation part B and the non-laser irradiation part C and the set value σ of the turn-on voltage fluctuation satisfies a formula of $L \geq 7.2 \times 10^4 / \sigma^2$. As a result, the turn-on voltage fluctuation of the FED to be manufactured can be set within the set value.

Furthermore, by setting the raised CNT part height to 2 μm or higher, more preferably, 3 μm or higher, the emission (electron emission) is sufficiently improved, and the fluctuation can be mitigated. In addition, when the laser irradiation is carried out from the entire surface of the cathode substrate, the energy density of the laser irradiation is set to 50 to 1000 (mJ/cm$^2$), more preferably, 100 to 500 (mJ/cm$^2$), the raised CNT part height can be controlled to high relatively stably. Thus, the electron emission characteristic is sufficiently improved, and therefore the fluctuation can be mitigated. Note that, according to this embodiment, the electron emission holes 4 are constituted by seven elongated circular holes for one pixel, but the number or the shape of the electron emission holes 4 is not limited to the above example.

Embodiment 2

Figure 19:
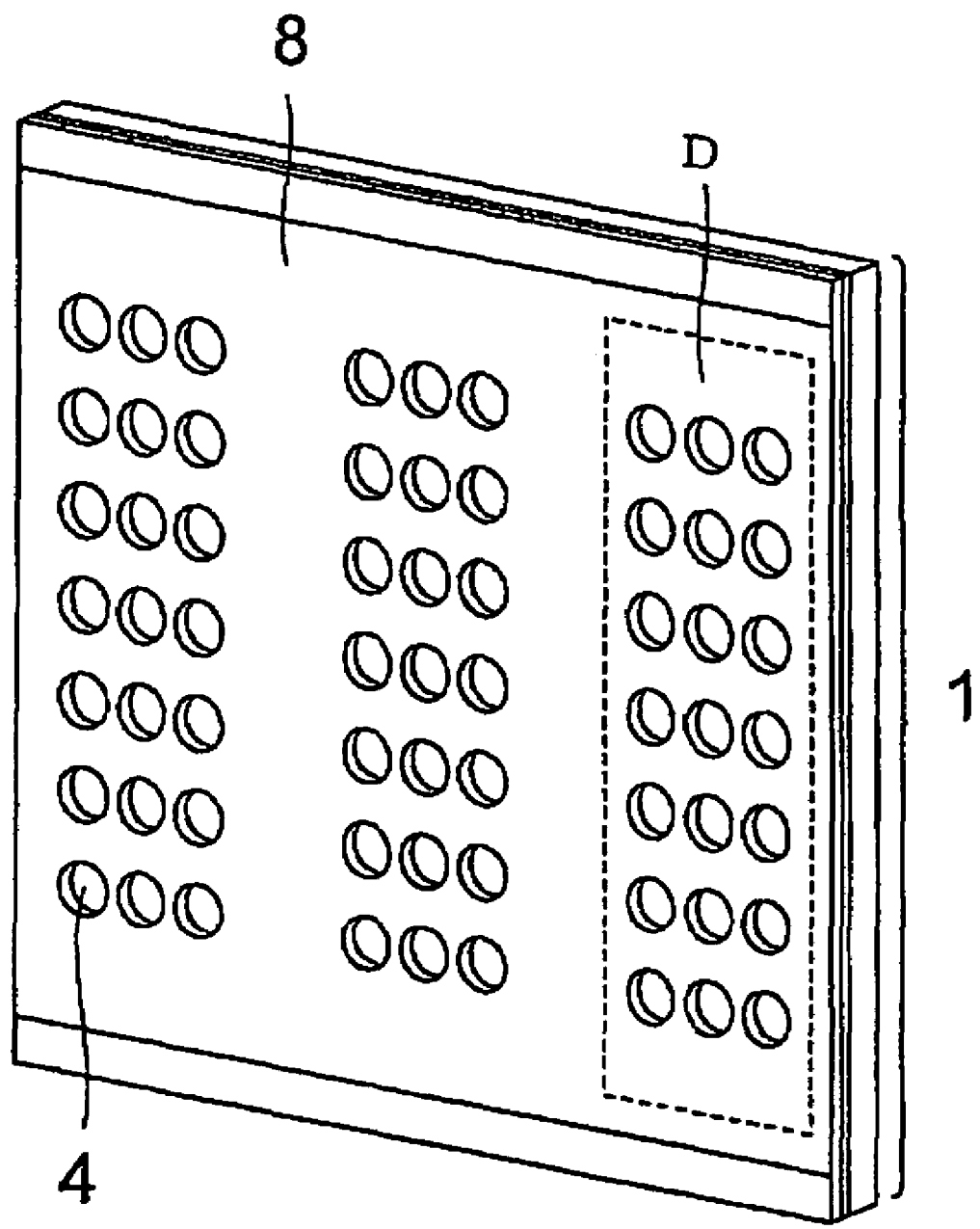
FIG. 19 is a perspective view showing a part of a field emission display according to Embodiment 2 of the present invention.
Figure 20:
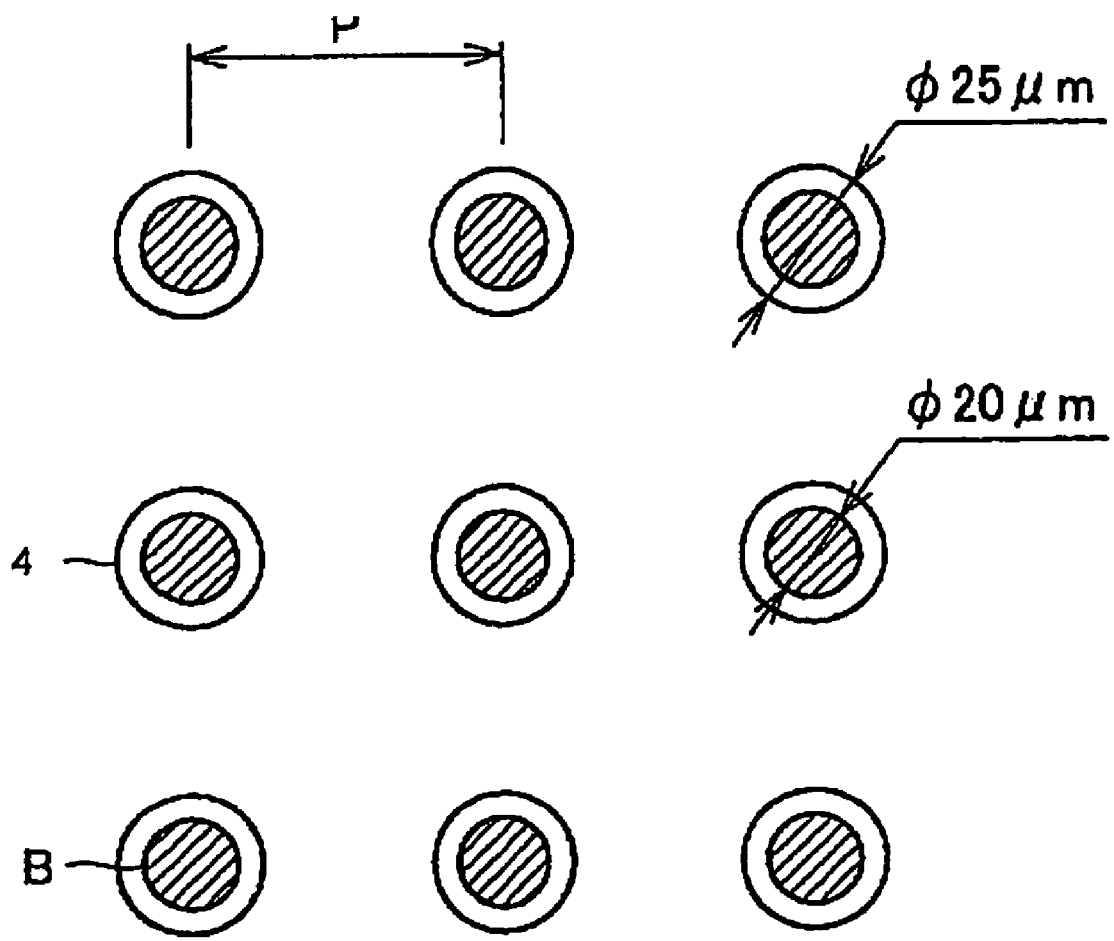
FIG. 20 is an enlarged plan view showing the vicinity of an electron emission hole provided in the field emission display according to Embodiment 2 of the present invention.

FIG. 19 is a perspective view schematically showing a structure of a cathode substrate of an FED according to Embodiment 2 of the present invention. FIG. 20 is an enlarged plan view showing the vicinity of the electron emission holes 4 of FIG. 19. As shown in FIGS. 19 and 20, in the structure according to this embodiment, a planer shape of the electron emission holes 4 is circular. The structure is different from the structure according to Embodiment 1 in that one laser irradiation part is formed corresponding to one electron emission hole 4.

While referring to FIG. 19, the region D corresponds to the electron emission holes 4 for one pixel, and plural (e.g., 21) electron emission holes 4 are formed for one pixel. Then, the raised CNT part height is about 3 μm.

With reference to FIG. 20, each of the electron emission holes 4 is formed of, for example, a circular hole with a diameter of 25 μm, and the holes are arranged in a square lattice. The pitch P for the arrangement of the electron emission holes 4 is not limited but is variable. The surface of the CNT printed layer 7 exposed from the electron emission holes 4 has one laser irradiation part B (hatching part) corresponding to one electron emission hole 4, and its diameter is 20 μm, for instance. It should be noted that the structure except for the above is substantially the same as the structure according to Embodiment 1 described above, and therefore the same or equivalent structural components will be given the same reference numerals and their description will be omitted.

According to this embodiment, at the time of laser irradiation, alignment between the cathode substrate and the laser irradiation pattern is performed, and one laser irradiation part B is formed corresponding to one electron emission hole 4. For this reason, high alignment accuracy is required for the laser irradiation. However, since a diameter of one laser irradiation part B is smaller than a diameter of the electron emission hole 4, the laser irradiation can be carried out without irradiating the leading electrode 8 with the laser beam. The technique is applicable even in the case where the leading electrode will be damaged upon laser beam irradiation.

Figure 21:
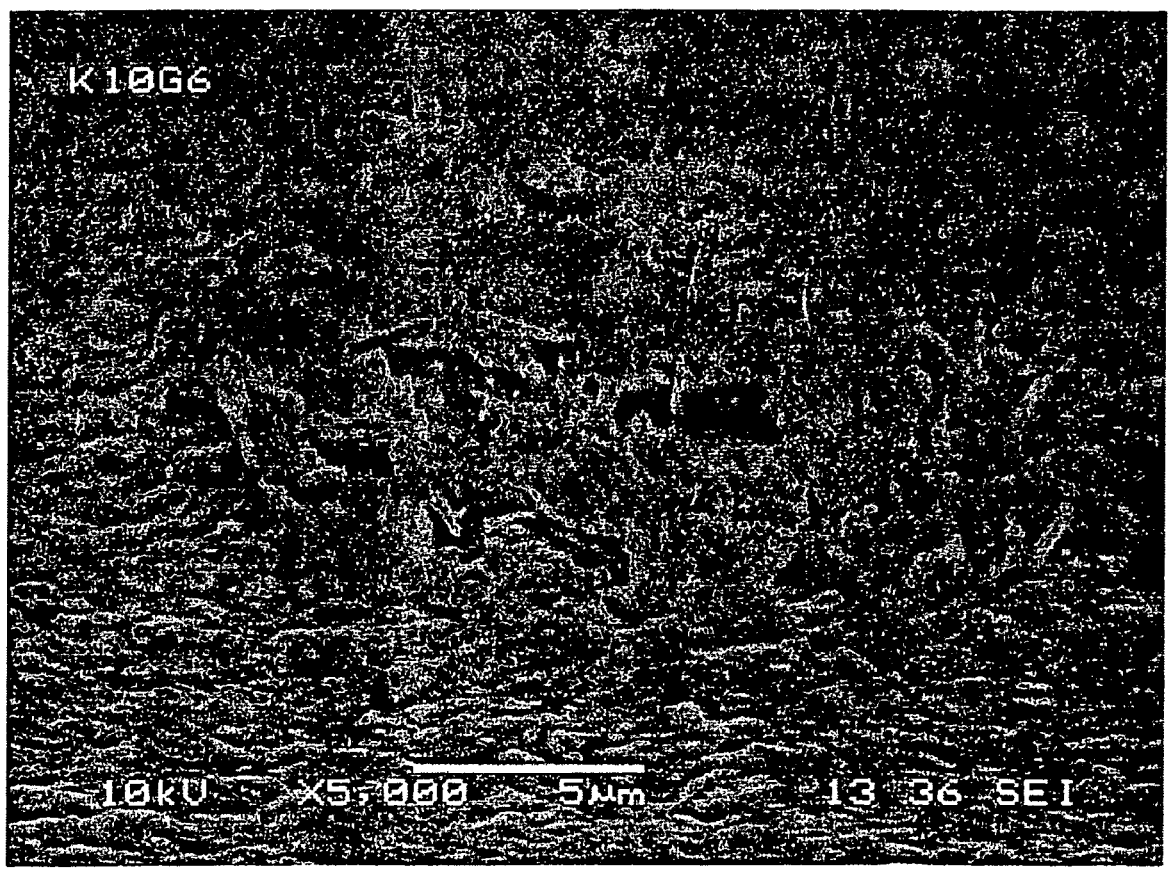
FIG. 21 is an electron micrograph showing a surface state of a CNT printed layer after laser irradiation is carried out in an experiment related to Embodiment 2 of the present invention.

FIG. 21 is an SEM photograph showing an example of the surface of the CNT printed layer 7 when the surface of the CNT printed layer 7 is irradiated with a laser beam with a circular pattern having a diameter of 20 μm. FIG. 21 reveals that similar to Embodiment 1, the CNTs are exposed at the boundary between the laser irradiation part B and the non-laser irradiation part C at best. As FIG. 18 shows the relationship between the boundary length L and the fluctuation σ, similar to Embodiment 1, in this embodiment as well, the above formula (1) is generally satisfied. Therefore, the boundary length L is set as in the formula (2) with respect to the permissible fluctuation σ, it is possible to suppress the fluctuation in the permissible range.

Figure 22:
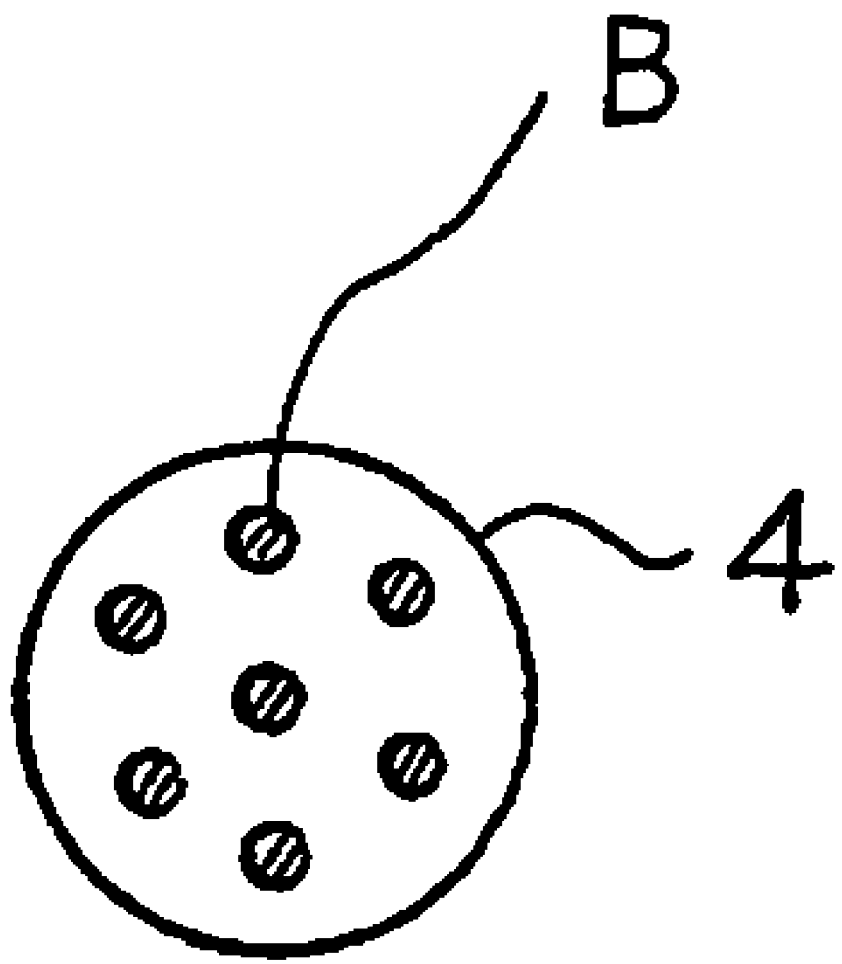
FIG. 22 is a diagram showing a modified example of a laser irradiation pattern in one electron emission hole of the field emission display according to Embodiment 2 of the present invention.

As in the above-mentioned manner, according to this embodiment, when the leading electrode 8 is not irradiated with the laser beam and the boundary length L is set as in the formula (2) with respect to the permissible fluctuation σ, it is possible to suppress the fluctuation in the permissible range. It should be noted that one electron emission hole has one laser irradiation region according to this embodiment, but similar to Embodiment 1, for example, one electron emission hole may have plural laser irradiation regions as shown in FIG. 22.

Embodiment 3

Figure 23:
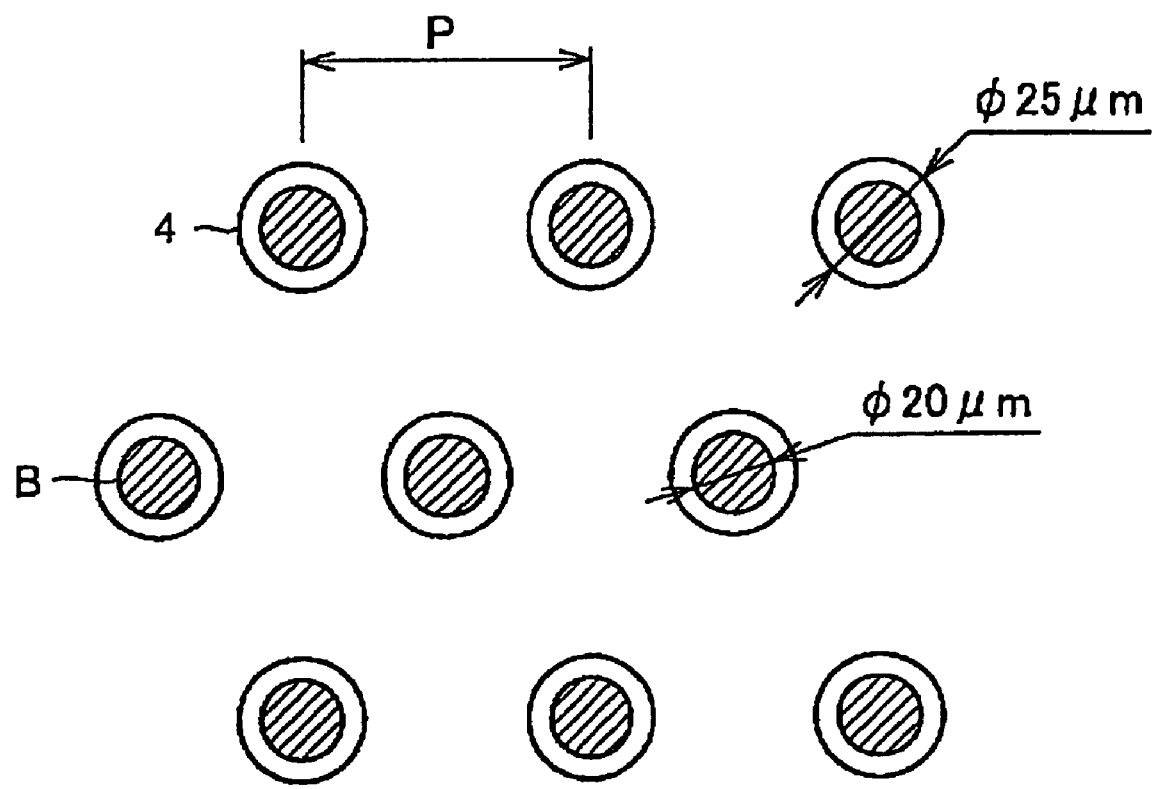
FIG. 23 is an enlarged plan view showing the vicinity of an electron emission hole provided to a field emission display according to Embodiment 3 of the present invention.

FIG. 23 is an enlarged plan view showing electron emission holes of an FED according to Embodiment 3 of the present invention. With reference to FIG. 23, a structure according to this embodiment is different from the structure according to Embodiment 2 only in the arrangement of the electron emission holes 4. The electron emission holes 4 according to this embodiment are arranged in hexagonal close-packed lattices (the electron emission holes 4 are situated on apexes of a regular triangle). It should be noted that the structure except for the above is substantially the same as the structure according to Embodiment 2 described above, and therefore the same or equivalent structural components will be given the same reference numerals and their description will be omitted.

According to this embodiment, the electron emission holes 4 and the laser irradiation parts B are shaped in dots, and each arrangement is in hexagonal close-packed lattices. Accordingly, the electron emission holes 4 and the laser irradiation parts B can be arranged at a high density, which makes the density of the exposed CNTs high. Thus, the satisfactory emission characteristic is attained and the fluctuation can be effectively mitigated.

Note that, according to this embodiment, the electron emission holes are arranged in hexagonal close-packed lattices, and correspondingly the laser beam irradiation is carried out in arrangement of hexagonal close-packed lattices. However, in the case where as shown in FIG. 22, for example, the minute hole of the electron emission hole 4 is irradiated with plural laser beams shaped in dots, and the laser irradiation regions B irradiated with the laser beams shaped in dots are arranged in hexagonal close-packed lattices, it is also possible to increase the number of the laser irradiation parts, and the electron emission efficiency can be improved.

Embodiment 4

Figure 24:
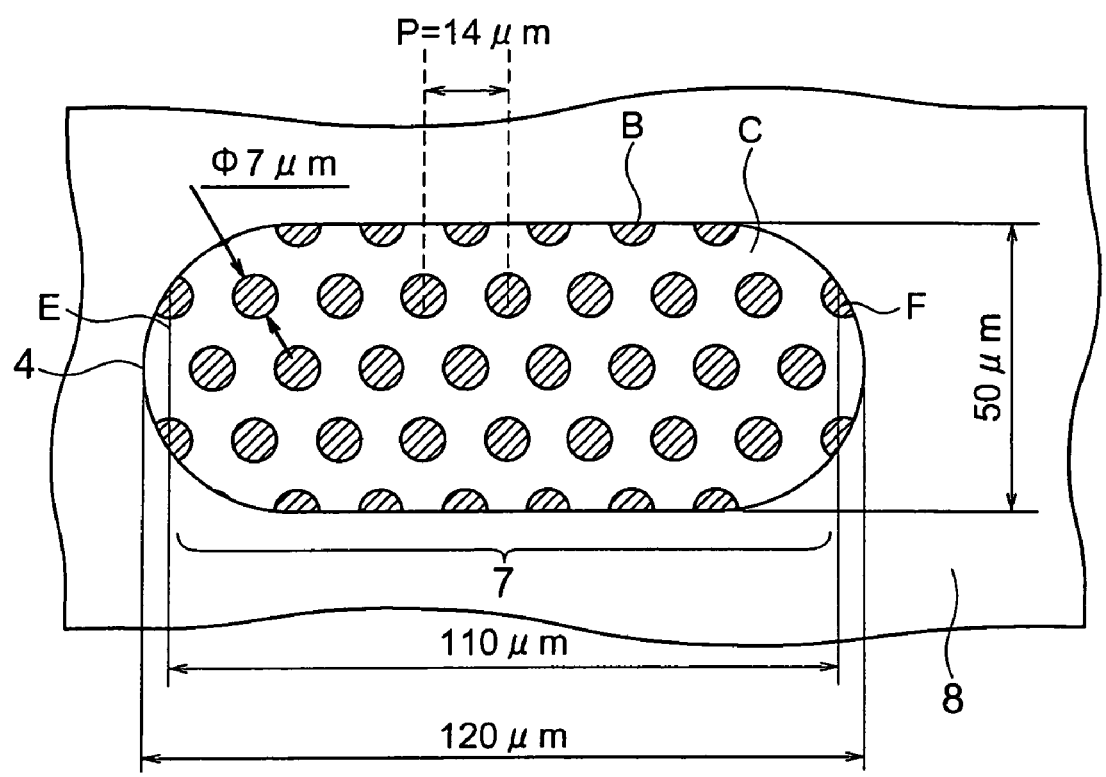
FIG. 24 is an enlarged plan view showing the vicinity of an electron emission hole, illustrative of a pattern of laser irradiation for a field emission display according to Embodiment 4 of the present invention.

FIG. 24 is an enlarged plan view showing an electron emission hole of an FED according to Embodiment 4 of the present invention. The structure according to this embodiment is different from the structure according to Embodiment 1 only in terms of the pattern for the laser irradiation parts. The pattern for the laser irradiation parts is shaped in dots and the diameter thereof is 7 μm and the pitch is 14 μm.

Figure 25:
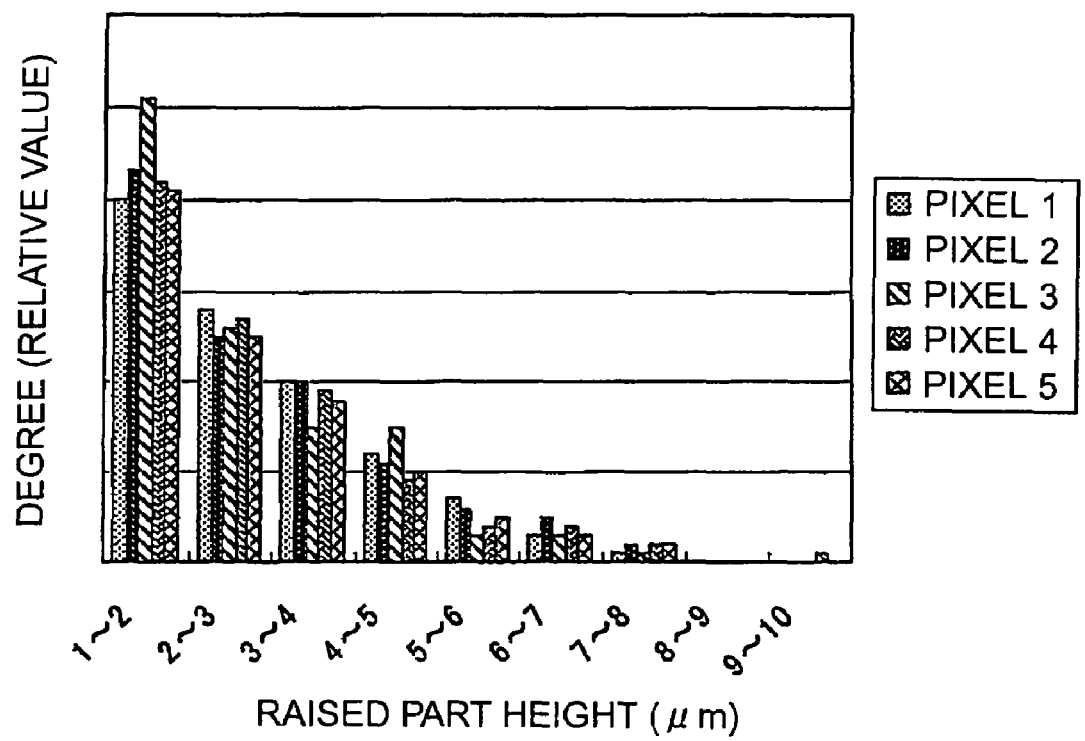
FIG. 25 is a graph representing a distribution regarding the height and number of raised parts of CNTs per pixel in an experiment related to Embodiment 1 of the present invention.

FIG. 25 is a graph representing a distribution regarding the height and the number of raised parts of CNTs with respect to plural pixels (equivalent of seven electron emission holes) when the pitch of the laser irradiation parts B is set to 20 μm upon the laser irradiation in Embodiment 1. The higher the raised CNT part is, the more easily the field emission occurs. Accordingly, the highest raised CNT part in each pixel functions as an indication for the electron emission characteristic of the pixel. When each pixel is checked, it is understood that the highest raised part has a height of 7 to 8 μm in average, but there is a pixel having a raised part with a height of 9 to 10 μm as an exception. Because the CNT printed layer 7 cannot be perfectly uniform and the laser energy and its distribution cannot be controlled in a perfect manner, a pixel having an exceptionally high raised CNT part may be generated as in the above. Thus, by reducing the number of such pixels with a distribution deviant from the average, the fluctuation can be set smaller.

Figure 26:
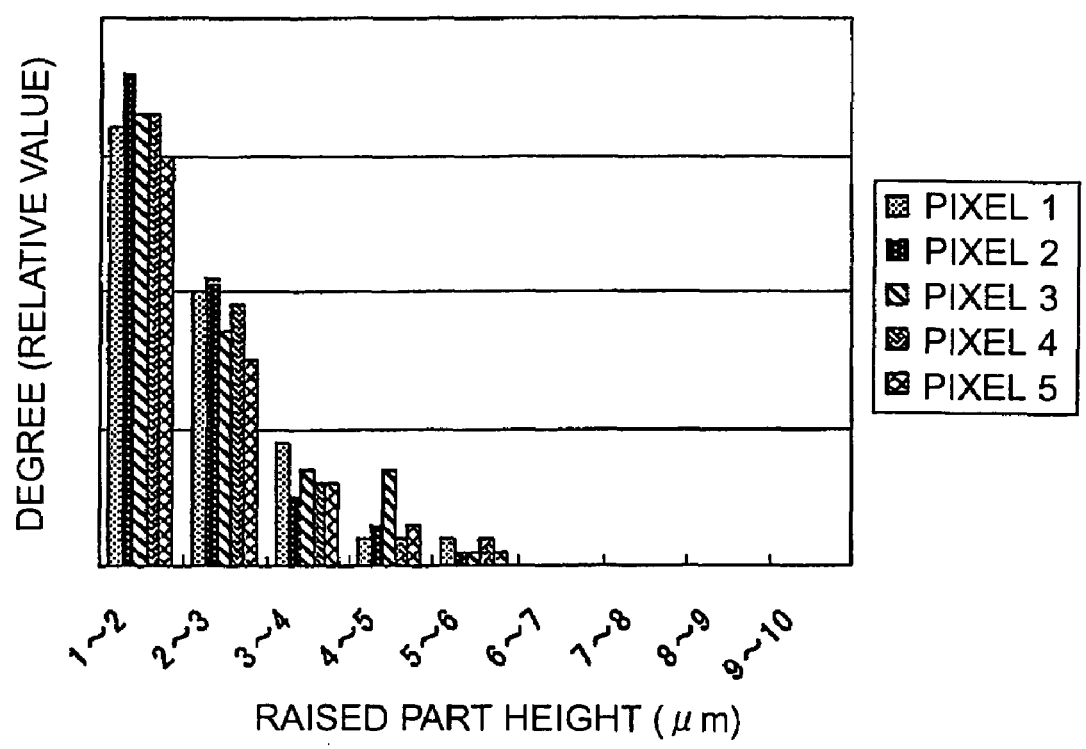
FIG. 26 is a graph representing a distribution regarding the height and number of raised parts of CNTs per pixel in an experiment related to Embodiment 4 of the present invention.

FIG. 26 a graph representing a distribution regarding the height and the number of raised parts of CNTs with respect to plural pixels according to Embodiment 4. As shown in FIG. 24, according to this embodiment, the heights of the highest raised parts can be made equal to each other without generating an exceptionally high raised part. As described above, when the CNT printed layer is irradiated with the laser beam, the CNTs fly out. If the adhesiveness to the CNT printed layer is stronger than the flying force, the adhered CNTs are left as the raised parts on the CNT printed layer, in particular, at the boundary between the laser irradiation parts and the non-laser irradiation parts. Therefore, basically, there is no raised part generated with its height larger than the size (diameter, side length, or diagonal line length) of one laser irradiation part. This embodiment utilizes the phenomenon so that the heights of the highest raised parts are made uniform, whereby the electron emission characteristics are made uniform. As an example of the size of the one laser irradiation part, at least it is necessary to make it smaller than the height of the highest raised part obtained when the laser irradiation is carried out on the region larger than the size of the raised part height. More preferably, the size is equal to or smaller than the heights of the highest raised parts obtained for each pixel in average when the laser irradiation is carried out on the region larger than the size of the raised part (according to this embodiment, about 7 μm or smaller). In addition, if the size of one laser irradiation parts is set to 1 μm or smaller, it is difficult to form the raised parts and also it is preferred to set the raised part height to about 3 µm or larger as described above for attaining satisfactory electron emission efficiency, the size of one laser irradiation part is also preferably set to about 3 µm or larger.

As has been described above, according to this embodiment, a height of the highest raised part when the laser irradiation region is set larger than the size of the raised CNT part height is represented by L1, and a height of one region having an energy value equal to or larger than the threshold value of energy to form the raised parts is represented by L2, when L2 is not larger than L1, more preferably, not larger than L1 and in the range from 3 µm to 7 µm by carrying out the laser irradiation with a spatially modulated pattern formed of, for example, a rectangular with one side (long side) not larger than L2 (alternatively, a circle with a diameter not larger than L2, a graphic form similar to those forms, or a combination of those), the heights of the highest raised parts are made equal to each other and the fluctuation of the electron emission characteristics among the pixels can be mitigated. However, this is a method of mitigating the fluctuation by making the raised part heights uniform while the raised part heights are kept low. An average electron emission hole rate will be slightly degraded, and it is therefore necessary to embody the method with consideration of the balance between the uniformity and the electron emission hole rate.

Figure 27:
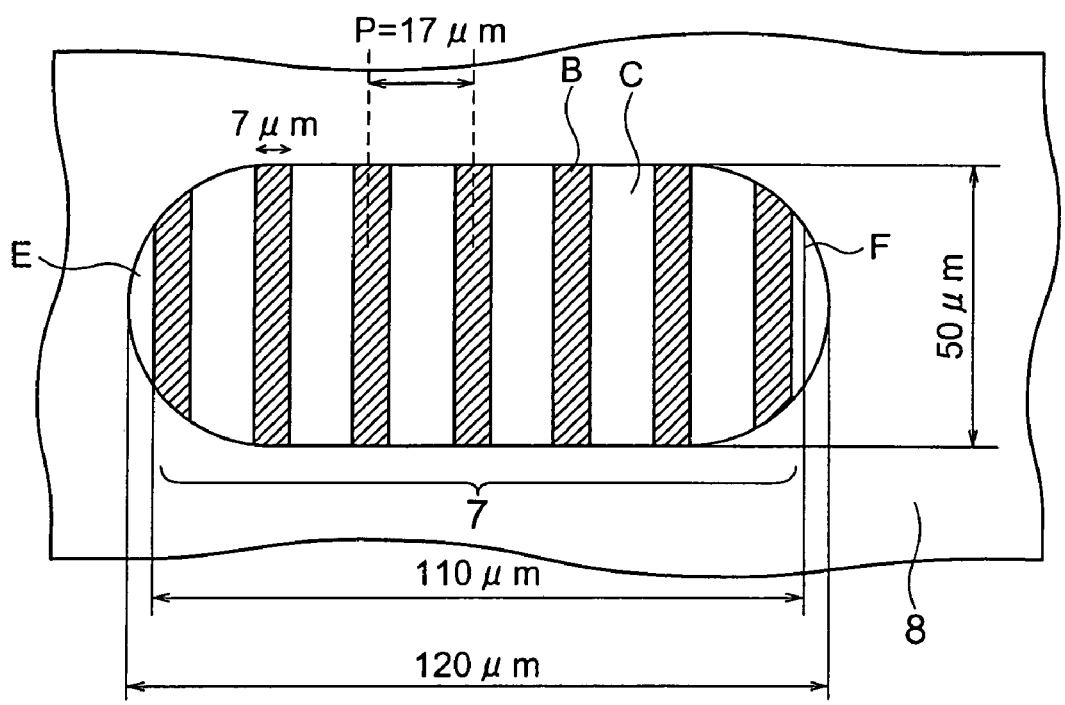
FIG. 27 is an enlarged plan view showing the vicinity of the electron emission hole, illustrative of a modified example of a laser irradiation pattern for the field emission display according to Embodiment 4 of the present invention.

Note that, according to this embodiment, the shape of one laser irradiation part is circular, but may be ellipse, square, hexagonal, or a combination of those, for example, as long as the size of the laser irradiation part is small enough so that the height of the raised part is substantially regulated. In addition, according to this embodiment, the circular shape of one laser irradiation part is employed in order not to generate the raised parts having a height larger than the diameter in any directions. In contrast, for example, in the case where one laser irradiation part uses a stripe pattern with a width of 7 µm as shown in FIG. 27, if the CNTs are curled up in the vertical direction in the drawing, a raised part with a height of 7 µm or larger may be generated. However, as compared with the case of Embodiment 1, the heights of the highest raised parts can be made uniform.

In other words, the laser beam irradiation may be carried out with a spatially modulated pattern formed by a combination of shapes including a circular shape having a diameter equal to a height of a predetermined highest raised part of the carbon nanotube in the laser irradiation part, a polygonal shape having a maximum diagonal line length equal to the height of the predetermined highest raised part, a shape similar to a circle or a polygon having a diameter, a side, or a diagonal line conforming to the height of the predetermined highest raised part, and a shape obtained by combining any of those shapes (those are not shown in the drawing).

Embodiment 5

Figure 28:
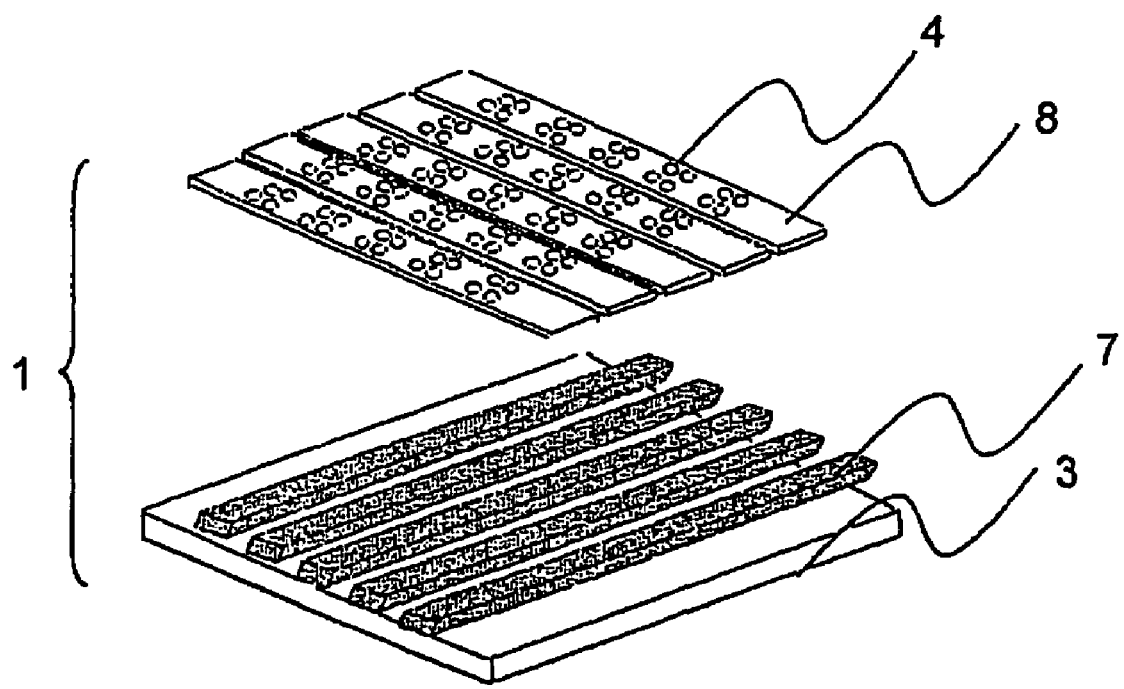
FIG. 28 is a perspective view of a cathode substrate of a field emission display according to Embodiment 5 of the present invention.

FIG. 28 shows an example of a structure of an FED according to Embodiment 5 of the present invention. According to this embodiment, the cathode substrate 1 is composed of the glass plate 3, and the CNT printed layer 7 is formed thereon in lines (in actual, a cathode electrode is formed between the glass plate 3 and the CNT printed layer 7). The leading electrode 8 has a plurality of circular electron emission holes 4 with a diameter of 5 µm. After the CNT printed layer 7 is formed, the leading electrode 8 is arranged above the CNT printed layer 7 with a space therebetween. When the cathode substrate 1 is irradiated with the laser beam having a uniform energy density, the leading electrode 8 provided with the electron emission holes 4 functions as an electron emission part processing mask. Thus, it is possible to irradiate the CNT printed layer 7 with a spatially modulated laser beam.

As described above, according to this embodiment, irradiation with the laser beam through the electron emission holes provided to the leading electrode makes it possible to irradiate the CNT printed layer 7 with a very fine pattern even with the laser beam having a uniform energy density. According to this embodiment, the CNT printed layer 7 is irradiated with the uniform laser beam while the leading electrode 8 is used as a mask, but may be irradiated with a laser beam more finely modulated than the laser beam modulated by the electron emission holes 4 of the leading electrode 8.

Figure 29:
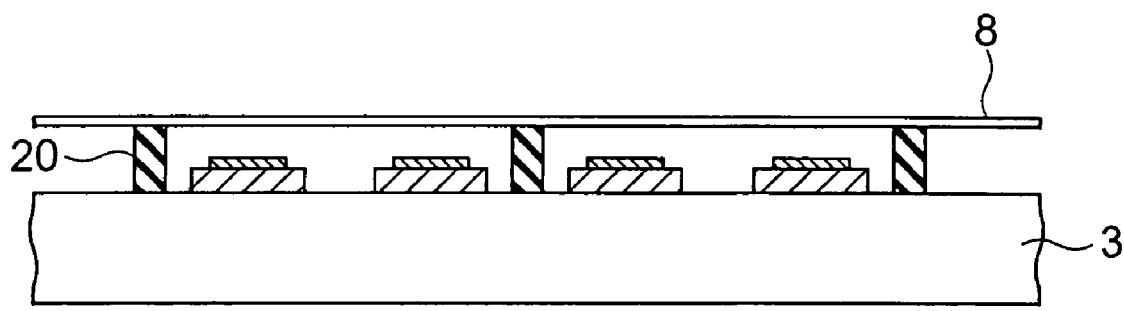
FIG. 29 is a sectional view of the cathode substrate of the field emission display according to Embodiment 5 of the present invention.

In addition, as a means for providing the leading electrode above the CNT printed layer, such a structure may be adapted that ribs 20 shown in FIG. 29, for example, are formed between the CNT printed layers 7, and the leading electrode 8 is disposed on the ribs. Also, the CNT printed layer 7 is formed in lines according to this embodiment, but the same effect can be attained even when the CNT printed layer 7 is formed in dots. Note that, the structure where the ribs 20 are formed to support the leading electrode 8 is also applicable to other embodiments.

Embodiment 6

Figure 30:
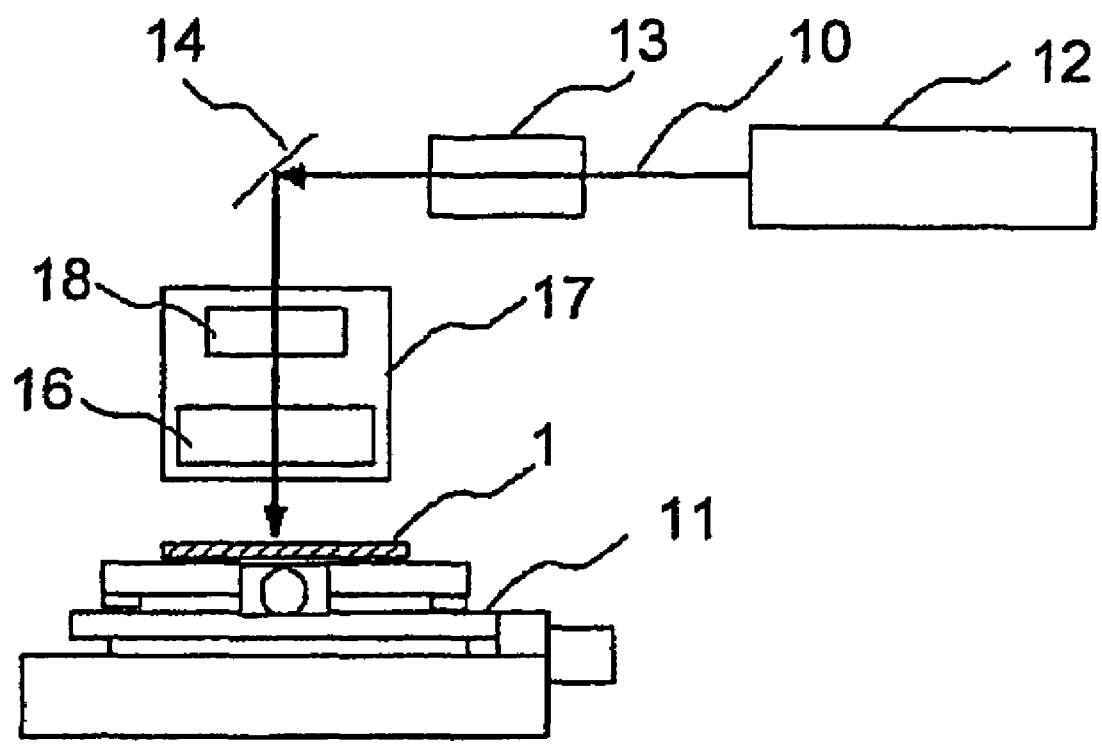
FIG. 30 is a construction diagram of a manufacturing apparatus for a field emission display for carrying out laser irradiation according to Embodiment 6 of the present invention.
Figure 31:
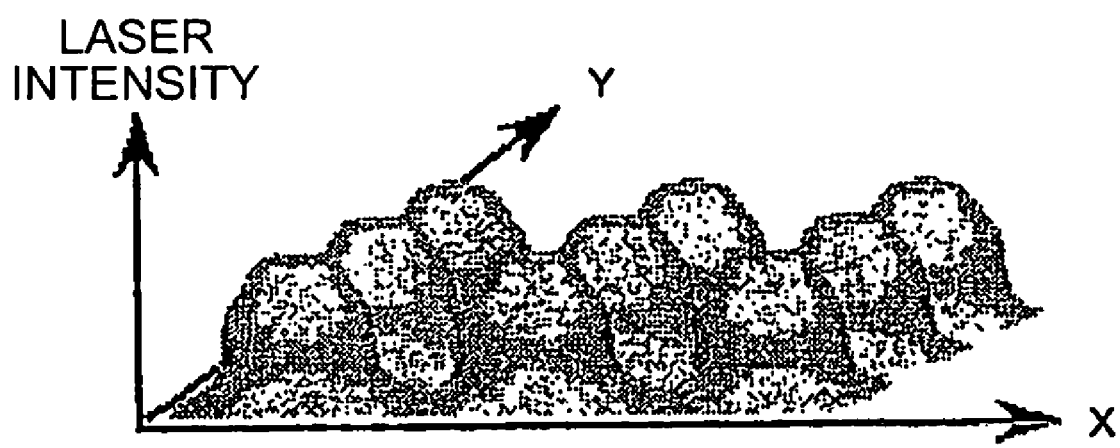
FIG. 31 is a diagram of an example of a beam intensity distribution formed by a hologram optical system in the manufacturing apparatus for the field emission display according to Embodiment 6 of the present invention.

FIG. 30 shows a structure of a manufacturing apparatus for carrying out laser irradiation according to Embodiment 6 of the present invention, which is different from that shown in FIG. 10 according to Embodiment 1. In the apparatus shown in FIG. 30, the cathode substrate 1 is fixed on the XY axis driving apparatus 11. The laser beam 10 from the laser oscillator 12 passes through the collimation optical system 13, the reflecting mirror 14, and an electron emission part processing holographic optical system 18 using a holographic optical element (HOE) to be converged by the convergent lens 16. Then, the cathode substrate 1 is irradiated with the convergent beam. By appropriately designing the hologram optical system, as shown in FIG. 31, for example, it is possible to realize a desired beam intensity distribution and the same irradiation as that of the manufacturing apparatus according to Embodiment 1. The electron emission part processing holographic optical system 18 and the convergent lens 16 are driven by the Z axis driving apparatus 17, and focus adjustment of the laser beam on the cathode substrate 1 is performed.

The holographic optical element is adapted to control a direction and an intensity of a laser beam by use of diffraction. Since the holographic optical element is not provided with a part for blocking light like a mask, it is generally possible to realize an optical system with a high use efficiency of the laser beam. To be specific, when the output of the laser oscillator 12 is the same, the structure of FIG. 30 allows the laser irradiation on a larger area at the same time as compared with the structure of FIG. 10. Alternatively, when the area to be simultaneously irradiated is the same, there is an effect in that the structure of FIG. 30 can employ the laser oscillator 12 with a smaller output as compared with the structure of FIG. 10. However, the holographic optical element is expensive. In the case where the apparatus specifications are often changed, the holographic optical element is not used in general.

Embodiment 7

Figure 32:
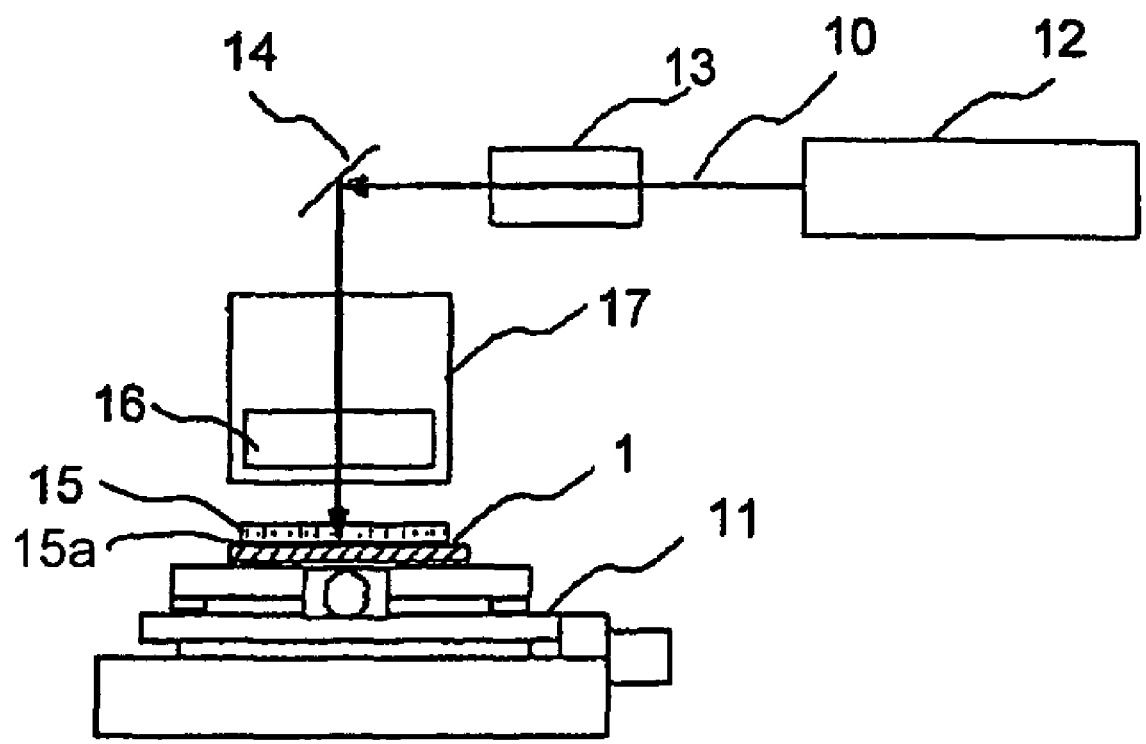
FIG. 32 is a construction diagram of a manufacturing apparatus for a field emission display for carrying out laser irradiation according to Embodiment 7 of the present invention.

FIG. 32 shows a structure of a manufacturing apparatus for carrying out laser irradiation according to Embodiment 7 of the present invention, which is different from those described in Embodiments 1 and 6. In the apparatus shown in FIG. 32, the cathode substrate 1 is fixed on the XY axis driving apparatus 11. The laser beam 10 from the laser oscillator 12 passes through the collimation optical system 13 and the reflecting mirror 14 to be converged by the convergent lens 16. The convergent beam enters the electron emission area processing mask 15 disposed nearly in close contact with the cathode substrate as a uniform beam. The convergent lens 16 is driven by the Z axis driving apparatus 17, and focus adjustment of the laser beam is performed. By forming an appropriate pattern on the electron emission area processing mask 15, similarly to Embodiment 1, the CNT printed layer can be irradiated with a desired pattern.

When the CNT printed layer 7 is irradiated with the laser beam while using a very fine stripe or dot pattern, reduction transfer is usually conducted. Upon reduction transfer, focus adjustment should be performed. For example, in the case where warpage of the cathode substrate 1 or the like occurs, a desired laser irradiation pattern cannot be obtained because the focus is out.

According to this embodiment, the electron emission area processing mask 15 is composed of a desired thin film mask pattern 15a formed on a thin glass plate for the mask, for example. In this way, such a structure is obtained that the electron emission area processing mask 15 and the CNT printed layer on the cathode substrate 1 are disposed closely and nearly in close contact with each other. Thus, it is also possible to suppress an influence to an irradiation pattern due to a focal displacement resulting from bending of the cathode substrate 1 or the like. However, the electron emission area processing mask 15 is used while being in close contact with the cathode substrate 1. Adhesion of a flying substance is caused, and therefore it is necessary to remove the flying substance through washing or the like for each irradiation. In addition, an energy density of the laser beam for irradiation needs to be small in such a range that the electron emission part processing mask is not damaged.

Embodiment 8

Figure 33:
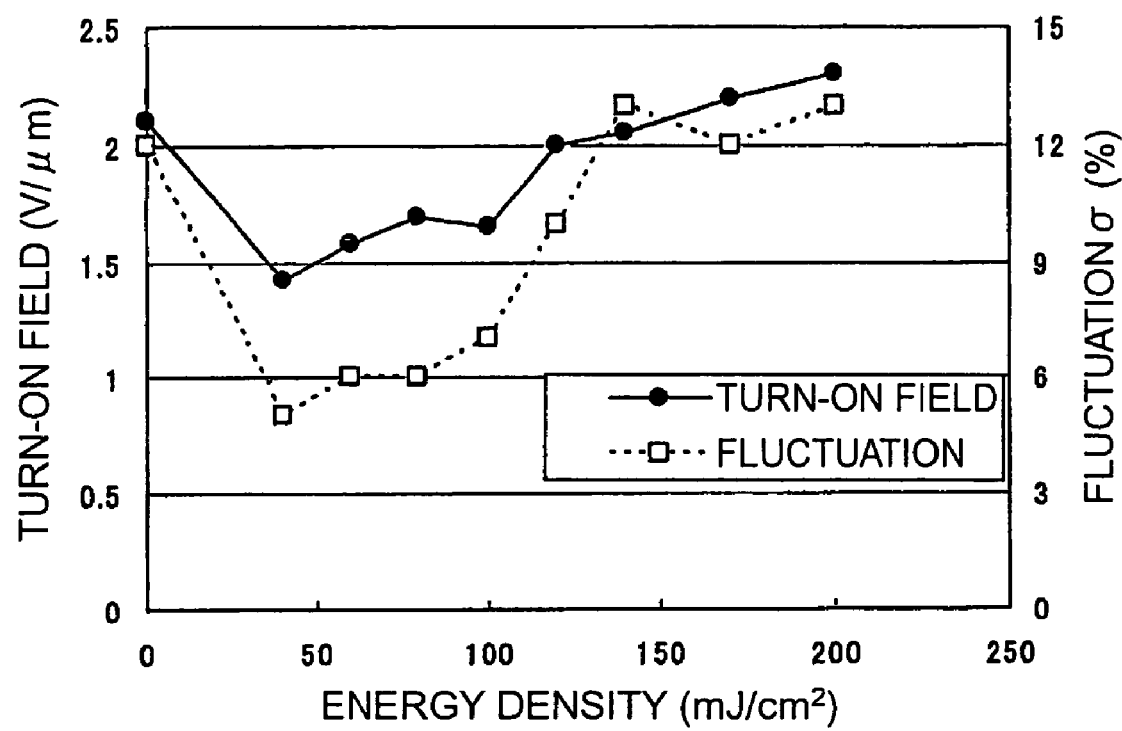
FIG. 33 is a graph representing a relationship between an energy density of a laser beam and a turn-on field in an experiment related to Embodiment 8 of the present invention.

Hereinafter, a manufacturing method according to Embodiment 8 of the present invention will be described. When raised parts of the CNTs are raised by means of laser irradiation, there are such cases where the electron emission efficiency is not sufficient possibly because the CNTs partially become amorphous or adhesion of impurities is caused. FIG. 33 is a graph representing how the average value of the turn-on field and the fluctuation of the turn-on field are changed when, after irradiation of a laser beam with a spatially modulated energy density of 200 (mJ/cm$^2$) similarly to Embodiment 1, irradiation of a uniform laser beam with a spatially modulated energy density of 200 (mJ/cm$^2$) or smaller is carried out again. The plot for the irradiation energy density of 0 (mJ/cm$^2$) corresponds to a case where the second irradiation is not carried out. The turn-on field in this case is about 2.1 V/μm. On the other hand, when the laser beam with the spatially modulated energy density of 200 (mJ/cm$^2$) is carried out again, new raised parts are generated by means of the reirradiation but the existing raised parts generated at the time of the first irradiation are destroyed, whereby the turn-on field slightly increases. It is understood that as the energy density of the second laser irradiation is reduced, the turn-on field gradually decreases. In particular, this effect is significant when the energy density is about 100 (mJ/cm$^2$) or smaller. This is possibly because the impurities are removed through the laser irradiation with an energy density of about 100 (mJ/cm$^2$) or smaller without destroying the raised part generated upon the first irradiation, since the threshold for forming raised parts in the CNT printed layer is about 100 (mJ/cm$^2$) according to this embodiment. FIG. 33 reveals that when the turn-on field is small, the fluctuation of the turn-on field is also small. This is because, in this embodiment, the fluctuation decreases due to a statistical effect since the number of the emission sites is increased when the turn-on field is small.

As described above, after the raised parts of the CNTs are formed by means of the laser irradiation having an energy density equal to or larger than the threshold for forming the raised CNT parts, the laser irradiation having an energy density not larger than the above-mentioned energy density, more preferably, the laser irradiation having an energy density smaller than the threshold for forming the raised CNT parts, is carried out. As a result, the electron emission efficiency is enhanced, and the fluctuation can be mitigated.

According to this embodiment, the number of laser irradiation after the first laser irradiation is one. If laser irradiation having an energy density smaller than that of the first laser irradiation is performed plural times (a large number of times), the electron emission efficiency may be improved and its fluctuation may be mitigated. Moreover, although the spatially modulated laser irradiation is carried out for the first irradiation according to this embodiment, laser irradiation having a uniform energy density also produces an effect of improving the electron emission efficiency and mitigating the fluctuation.

Embodiment 9

Hereinafter, a description will be given with respect to a manufacturing method according to Embodiment 9 of the present invention. The pulse width of a laser used for welding and drilling process is usually about several tens of nsec. However, in recent years, a short pulse width on the picosecond or femtosecond time scale is available, and research and development thereon are in progress. In general, as compared with the case where laser irradiation is carried out with a conventionally-used pulse width, it is said that an influence from heat is small and a profile of processing depth conforming to a laser intensity profile can be obtained in the case where laser irradiation is carried out with a short pulse width.

Figure 34:
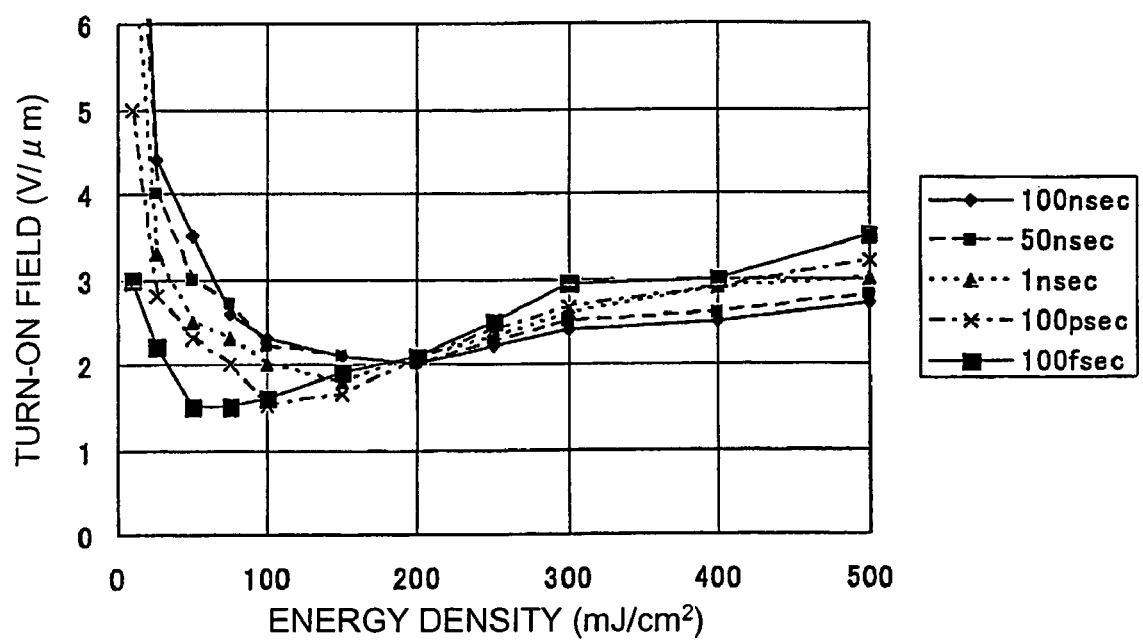
FIG. 34 is a graph representing a relationship between an energy density of a laser beam and a turn-on field in an experiment related to Embodiment 9 of the present invention.

FIG. 34 is a graph representing a relationship between: the energy density of laser when laser irradiation is carried out while changing a pulse width and an energy density similarly to Embodiment 1; and the turn-on field. FIG. 34 reveals that the smaller the pulse width, the smaller the energy density at which the turn-on field becomes minimum. The minimum value of the turn-on field can be set smaller with a use of a short pulse laser of 1 nsec or less, more preferably, 100 psec or less. Thus, the electron emission characteristic is improved, and the fluctuation can be mitigated. This is possibly because by means of short pulse laser irradiation with an appropriate energy, raised parts of the carbon nanotubes are formed, the carbon nanotubes are prevented from being amorphous since the influence from heat is small, and also the impurities adhered before the irradiation can be removed. Further, in the short pulse laser, the process depth profile conforming to the intensity profile is easily obtained, and the shape of the raised parts are formed relatively conforming to the profile. For this reason, the raised part shape for each irradiation region is made uniform. In this way, the number of the emission sites increases, and also the raised parts are made uniform, whereby the fluctuation can be mitigated. In addition, although the spatially modulated laser irradiation is carried out according to this embodiment, laser irradiation with a uniform energy density has an effect of improving the electron emission efficiency and mitigating the fluctuation.

Note that a pulse width range for the short pulse laser beam preferably falls in a range from 1 asec to 1 nsec. The upper limit of 1 nsec is set based on FIG. 34 because the effect significantly appears at 1 nsec or less, and the lower limit of 1 asec (attosecond) is set because there currently exist no lasers practically realizing the pulse width smaller than this level.

Embodiment 10

Figure 35:
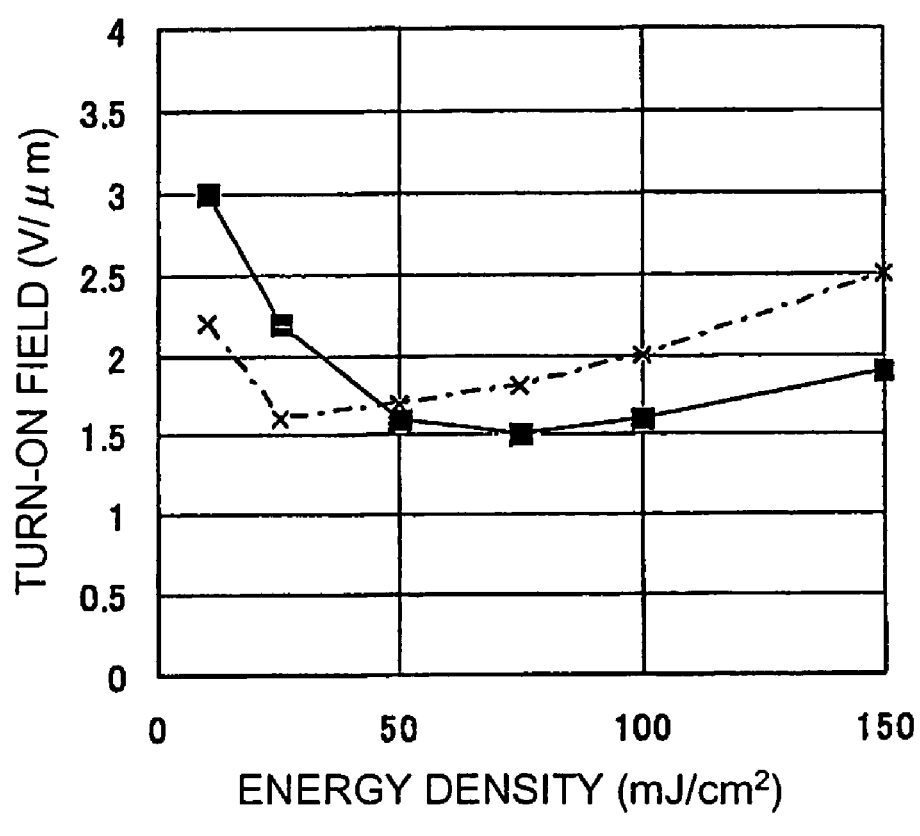
FIG. 35 is a graph representing a relationship between an energy density of a laser beam and a turn-on field in an experiment related to Embodiment 9 of the present invention.
Figure 36:
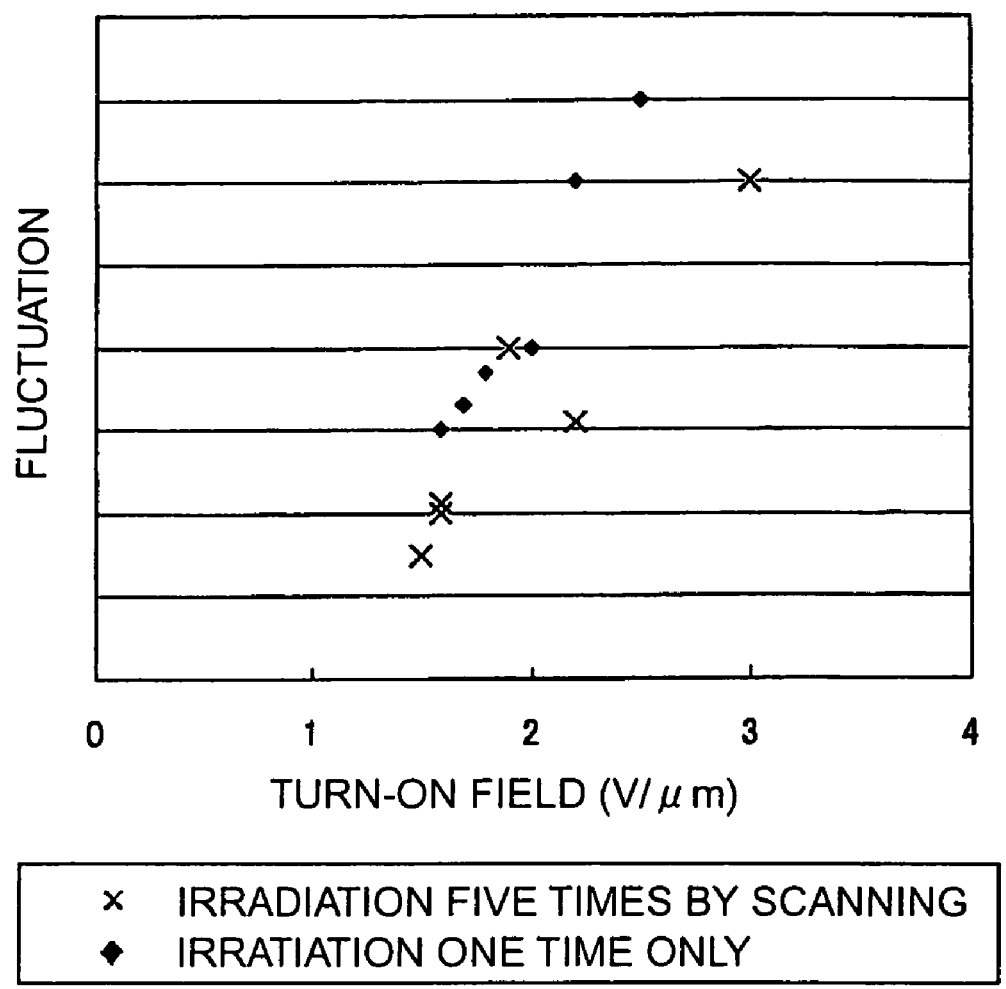
FIG. 36 is a graph representing a relationship between a turn-on field and a fluctuation σ in an experiment related to Embodiment 10 of the present invention.

Hereinafter, a manufacturing method according to Embodiment 10 of the present invention will be described. When a sample, namely, the cathode substrate of the FED, or the laser is scanned during irradiation so that the same spot is irradiated several times with deflected light of a laser beam with a pulse width of a femtosecond level, it is known that irregularities with a period of about a laser wavelength may be formed in a self-organizing way. An experiment is performed for the case where the same spot is irradiated once with a laser beam having a pulse width of 100 fsec while changing its energy density similarly to Embodiment 1 and for the case where the same spot is irradiated five times with a laser beam shaped in an about 40-μm-wide stripe at 10 Hz while scanning the cathode substrate at 80 μm/sec. FIG. 35 is a graph representing a relationship between the energy density and the turn-on field of the laser beam. The minimum value of the turn-on field is slightly higher in the case of irradiation with scanning possibly because an influence appears when the raised parts are destroyed through laser multiple irradiation. FIG. 36 is a graph representing a relationship between the turn-on field and the fluctuation for each case. The fluctuation is smaller in the case of irradiation with scanning possibly because an effect appears due to continuous raised part fabrication. In this embodiment, although apparently periodic raised parts cannot be fabricated, continuous raised part fabrication is achieved. If the flatness of the CNT printed layer before laser irradiation is still higher, apparently periodic raised parts may be fabricated, thereby further mitigating the fluctuation. Thus, in the irradiation step, laser beam irradiation is carried out plural times while shifting the cathode electrode or the laser beam to produce an overlap of laser beam irradiation parts between two successive operations of laser beam irradiation, thereby allowing the carbon nanotube to be raised in a self-organizing manner on a periodic basis. The periodic raised part fabrication may allow regularly uniform raised part fabrication, and the electron emission characteristic (the emission characteristic) can be made uniform.

Embodiment 11

Figure 37:
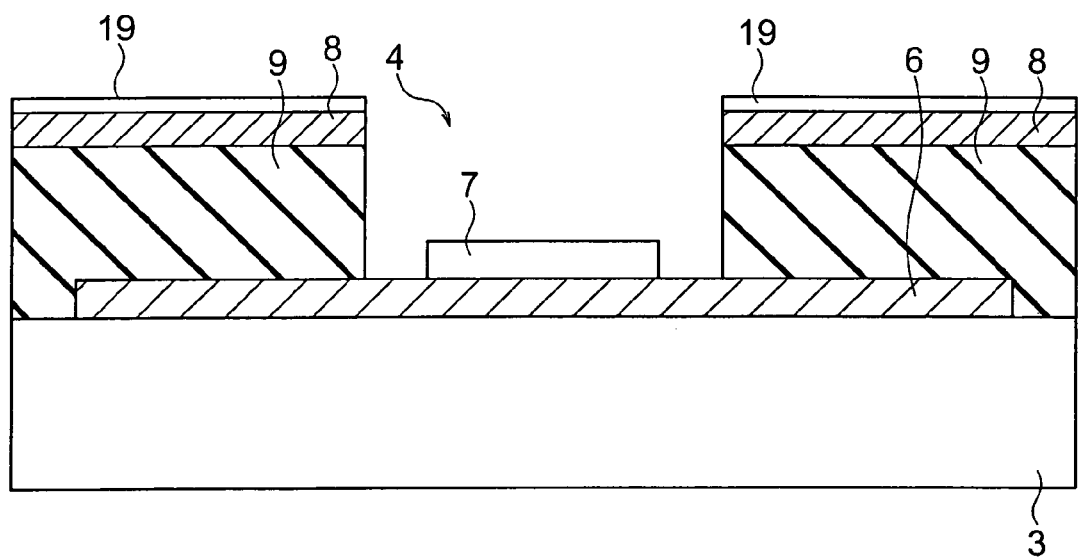
FIG. 37 is an enlarged sectional view showing the vicinity of an electron emission hole provided in a field emission display according to Embodiment 11 of the present invention.

Based on FIG. 37, a manufacturing method for an FED according to Embodiment 11 of the present invention will be described. As shown in FIG. 37, according to this embodiment, a silane coupling agent layer 19 is formed above the leading electrode 8. The CNT printed layer is irradiated with a laser beam having an energy density of 200 (mJ/cm$^2$) on an area larger than one electron emission hole 4. When the leading electrode 8 is directly irradiated with the laser beam, peeling may occur on the leading electrode. Therefore, the silane coupling agent layer 19 is formed for increasing the adhesiveness to the insulating layer 9 to avoid the leading electrode peeling even when the laser directly hits the leading electrode 8.

By thus forming the silane coupling agent layer above the leading electrode, wide area irradiation can be carried out without performing such precise alignment that the laser irradiation part is situated only in the electron emission hole.

Embodiment 12

Figure 38:
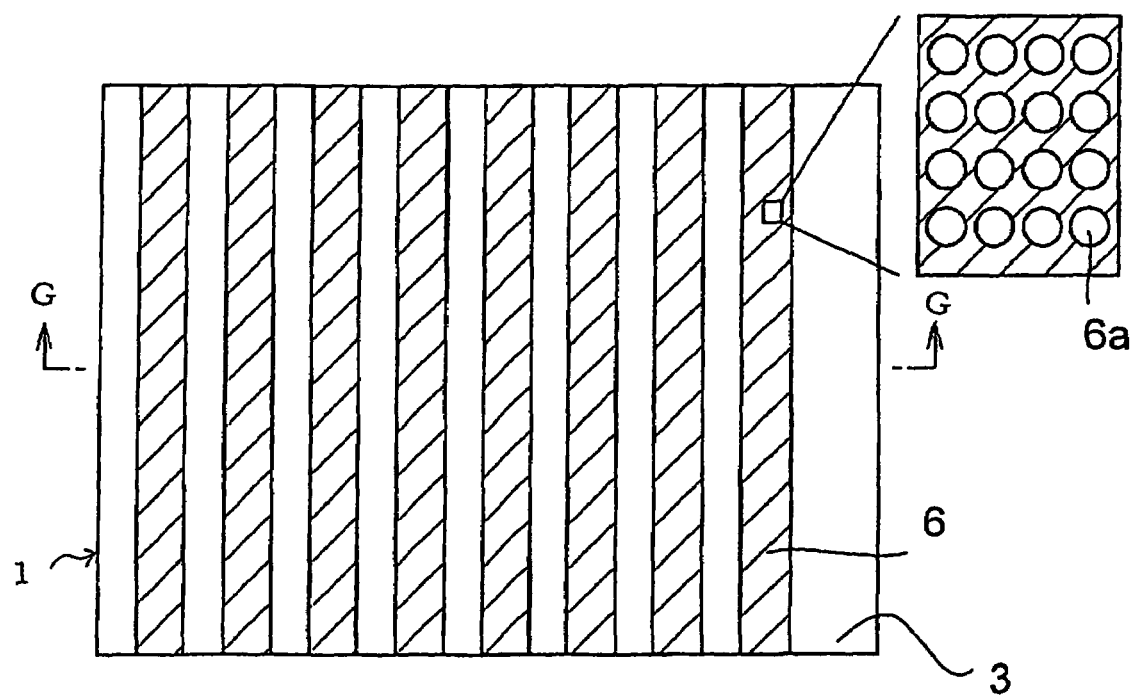
FIG. 38 is an enlarged plan view showing a part of a cathode substrate of a field emission display according to Embodiments 12 and 13 of the present invention.
Figure 39:
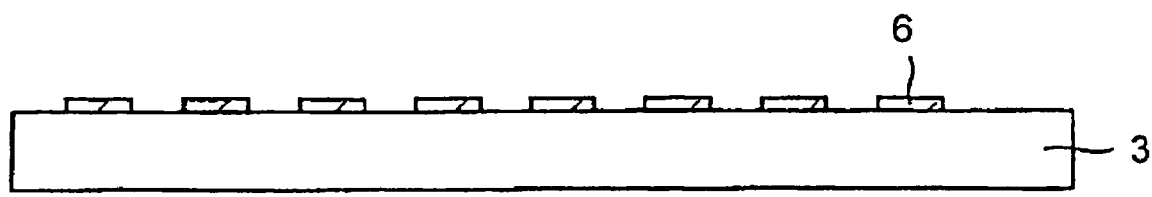
FIG. 39 is an enlarged sectional view showing a part of the cathode substrate of the field emission display according to Embodiments 12 and 13 of the present invention.
Figure 40:
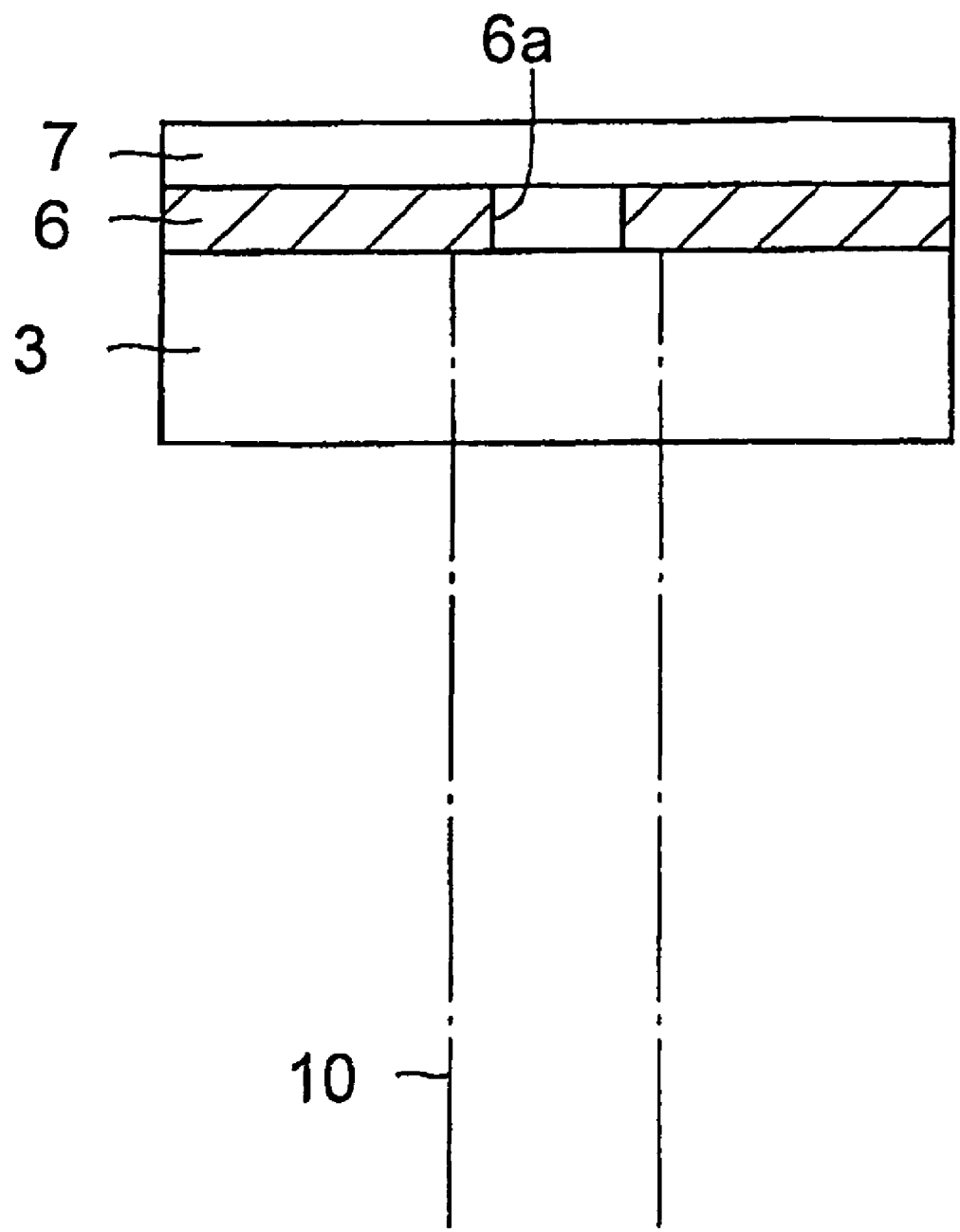
FIG. 40 is an enlarged sectional view illustrative of a laser irradiation method of the field emission display according to Embodiments 12 and 13 of the present invention.

Based on FIGS. 38 to 40, a description will be given to a manufacturing method for an FED according to Embodiment 12 of the present invention. FIG. 38 is a schematic plan view showing a structure of the cathode electrode formed on the glass plate of the FED according to this embodiment. FIG. 39 is a schematic sectional view taken along the line G-G of FIG. 38. With reference to FIGS. 38 and 39, the cathode electrode 6 formed on the glass plate 3 is provided with a large number of minute through holes 6a penetrating through the cathode electrode 6 in a structure of this embodiment.

In this embodiment, the cathode electrode 6 is made of a metal thin film, and the large number of minute through holes 6a are formed through etching employing a photolithography technology. As shown in FIG. 40, after the CNT printed layer 7 is formed on the cathode electrode 6, laser irradiation is carried out from a rear surface of the glass plate 3, thereby forming the laser irradiation parts and the non-laser irradiation parts on the CNT printed layer 7 utilizing the cathode electrode 6 as a mask. At the boundary between the laser irradiation parts and the non-laser irradiation parts, it is certain that the CNTs are particularly exposed. Thus, the electron emission efficiency can be improved and the fluctuation can be mitigated.

As described above, when the CNT printed layer 7 is irradiated with the laser beam having very fine stripe or dot pattern, reduction transfer as well as a complicatedly structured optical system are usually required. Upon reduction transfer, focus adjustment should be performed. Warpage or inclination of the cathode substrate 1 leads to focus shift and a desired laser irradiation pattern cannot be obtained. According to this embodiment, laser irradiation is carried out from the rear surface of the glass plate 3, the cathode electrode 6 can be utilized as the electron emission part processing mask. The mask and the CNT printed layer 7 are in contact with each other, and therefore a very fine pattern can be easily formed, and it is possible to suppress the focus shift due to bending of the glass plate 3 or the like.

Embodiment 13

Embodiment 13 differs from Embodiment 12 only in the method of forming the large number of minute through holes in the cathode electrode 6, and others are similar to Embodiment 12. According to this embodiment, the cathode electrode 6 is formed by printing or applying on the glass plate 3 a conductive paste mixed with balls (not shown) having a diameter of 3 μm made of an organic material, PMMA (polymethylmethacrylate). Fine particles made of the PMMA disappear at a temperature equal to or lower than the allowable temperature limit (melting point temperature) for glass. A mixing weight ratio for the conductive paste:PMMA is 10:1. The glass plate 3 having the cathode electrode 6 printed thereon is dried and thereafter baked at a temperature equal to or lower than the allowable temperature limit for glass and equal to or higher than a temperature at which the fine particles disappear. At this time, the PMMA as an organic material disappears. Then, the cathode electrode provided with a large number of minute through holes (not shown: which are similar to the holes 6a of FIG. 38) is formed.

According to this embodiment, since the photolithography technology is not used, the minute holes can be manufactured at low costs. PMMA is used as the material for forming the holes, but other materials may produce the similar effect as long as the materials disappear at a temperature not higher than the glass allowable temperature limit.

Embodiment 14

Based on FIGS. 41 to 44, a designing method for the FED according to Embodiment 14 of the present invention will be described. As described above, when the CNT printed layer is irradiated with laser irradiation, the CNTs are satisfactorily exposed and raised at boundaries between the laser irradiation parts and the non-laser irradiation parts. If the raised part height and the boundary length, that is, the number of emission sites increase, the electron emission efficiency is improved, and the fluctuation can be mitigated. However, conditions may exist for relatively uniformly raising the CNTs not only at boundaries between the laser irradiation parts and the non-laser irradiation parts but also on the entirety of the laser irradiation parts for example, or for raising the CNTs in the center areas of the laser irradiation parts. This embodiment represents a designing method by predicting the electron emission characteristic and its fluctuation of the CNT printed layer having exposed and raised parts not only at the boundaries but also somewhat randomly selected areas.

Firstly, experimentally or theoretically, a formula is defined for the electron emission characteristic of one emission site. According to this embodiment, the following formula (3) is given based on the Fowler-Nordheim equation. An emission site height H is treated as a random number changing at each emission site.

[Formula 4] (3)

$$i(E, H) = 24 \times 10^{-7} (EH^{0.76})^2 \exp\left(\frac{-13.8 \times 10^4}{EH^{0.76}}\right)$$

i: Emission current (μA), E: Field (V/μm), H: Emission site height (μm)

Secondly, a distribution of the number of the emission sites corresponding to the emission site height is obtained. According to this embodiment, the number of the CNTs at the height H is supposed to follow a normal distribution, and the following formula (4) is set wherein N is the total number of raised parts for each pixel, $H_{ave}$ is an average value of the raised part heights, and $\sigma_H$ is a standard deviation of the raised part heights. The raised part total number N is also treated as a random number changing at each pixel to follow the normal distribution with $\sigma_N$ being as the standard deviation.

[Formula 5] (4)

$$n(H_i) = \frac{N}{\sqrt{2\pi}\sigma_H} \exp\left(\frac{-(H_{ave} - H_i)^2}{2\sigma_H^2}\right)$$

$n(H_i)$: Number of raised parts with height $H_i$ (piece), N: Number of raised parts (piece), $H_{ave}$: Average value of raised part heights (μM), $\sigma_H$: Standard deviation of raised part heights (μm)

Thirdly, a current value I at a certain field E is found by the following formula (5).

[Formula 6] (5)

$$I(E) = \int_0^\infty n(H) \cdot i(E, H) dH$$

A random number is used to generate one N and then Hs whose number is N, and the emission characteristic of one pixel is found by continuously calculating the formula (5) regarding the field E. Therefore, when N and H are obtained through random number generation for plural pixels and the emission characteristic is found for each pixel, it is possible to find an average electron emission characteristic over the pixels and a fluctuation among the pixels. According to this embodiment, the raised part number N and the raised part height H are obtained through normal random number generation.

Figure 41:
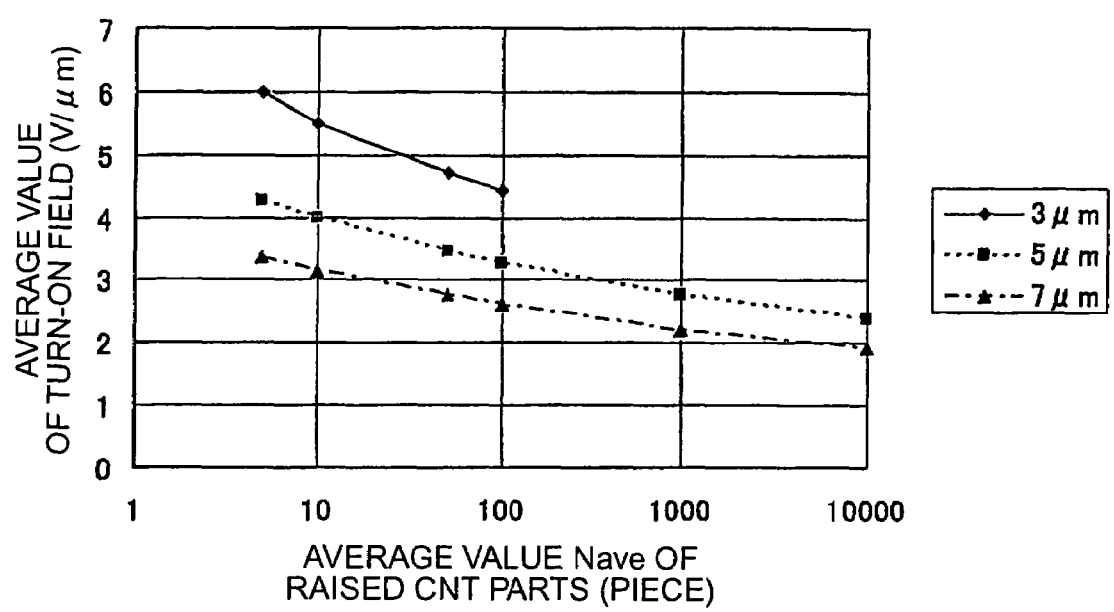
FIG. 41 is a graph representing a relationship between an average value of raised CNT parts and an average value of turn-on fields in a designing method for a field emission display according to Embodiment 14 of the present invention.
Figure 42:
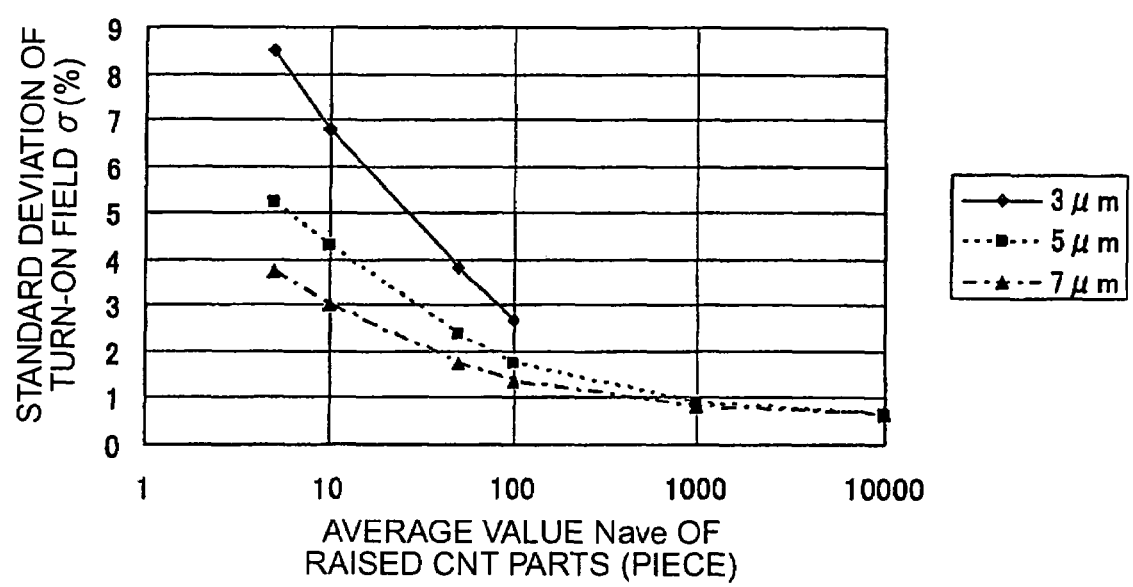
FIG. 42 is a graph representing a relationship between an average value of raised CNT parts and a standard deviation of the turn-on field in the designing method for the field emission display according to Embodiment 14 of the present invention.

FIG. 41 shows results of the turn-on field calculation (the turn-on field average value) while changing the average value $N_{ave}$ of the emission sites for pixel. FIG. 42 shows results of finding the turn-on field fluctuation (the turn-on field standard deviation) at this time. The average value of the raised part height $H_{ave}$ is calculated in three ways including 3 μm, 5 μm, and 7 μm, the height fluctuation $\sigma_H$ is set to 0.8 μm in any cases. The emission site number fluctuation $\sigma_N$ is 10% of the emission site average value in the respective cases. FIGS. 41 and 42 reveals that the large emission site number and large raised part height provide advantages in terms of electron emission characteristic improvement and fluctuation mitigation.

Figure 43:
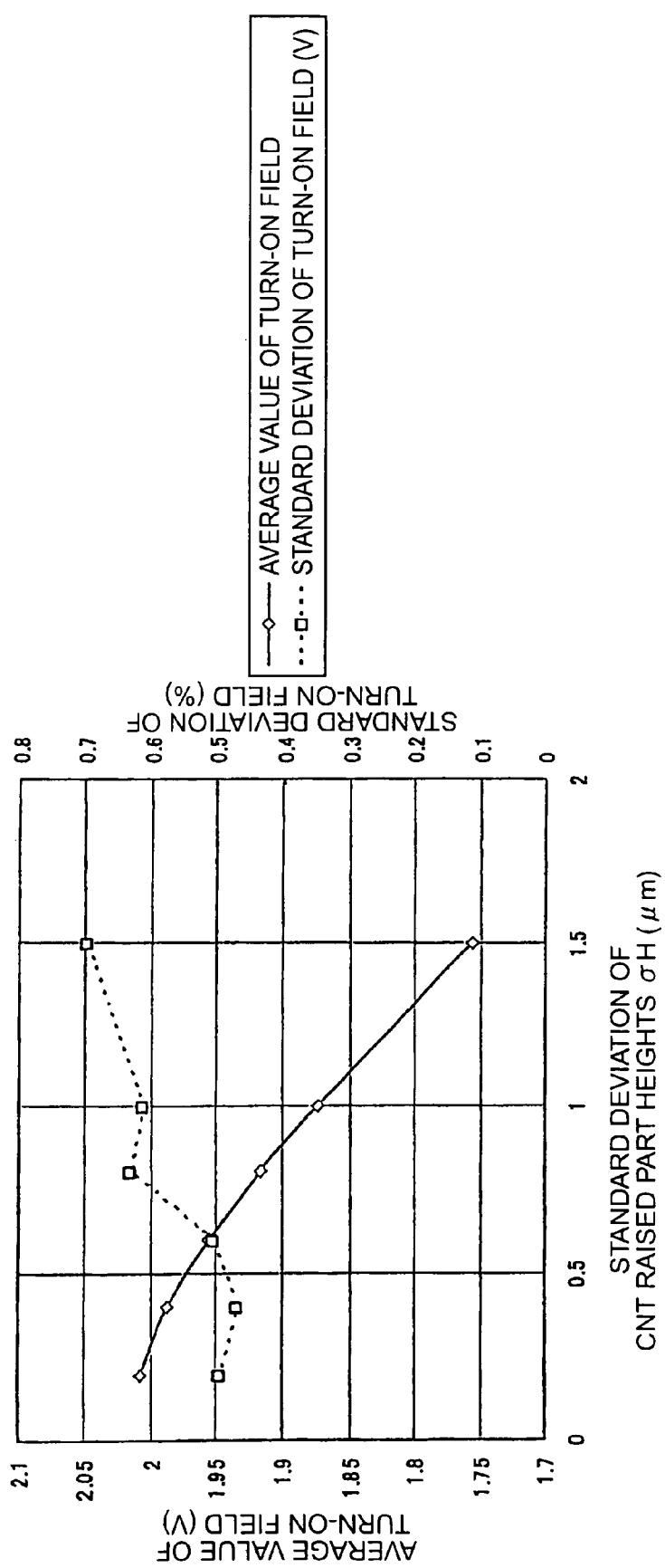
FIG. 43 is a graph representing a relationship between a standard deviation of heights of raised parts of CNT and an average value of turn-on fields according to Embodiment 14 of the present invention.

Then, FIG. 43 shows results of finding the turn-on field average value and its fluctuation (the turn-on field standard deviation) when the raised part height standard deviation varies. In FIG. 43, the calculation is conducted where $N_{ave}$=10000, $\sigma_N$=1000, and $H_{ave}$=7 μm. FIG. 43 reveals that the smaller height standard deviation, the smaller the turn-on field fluctuation.

Figure 44:
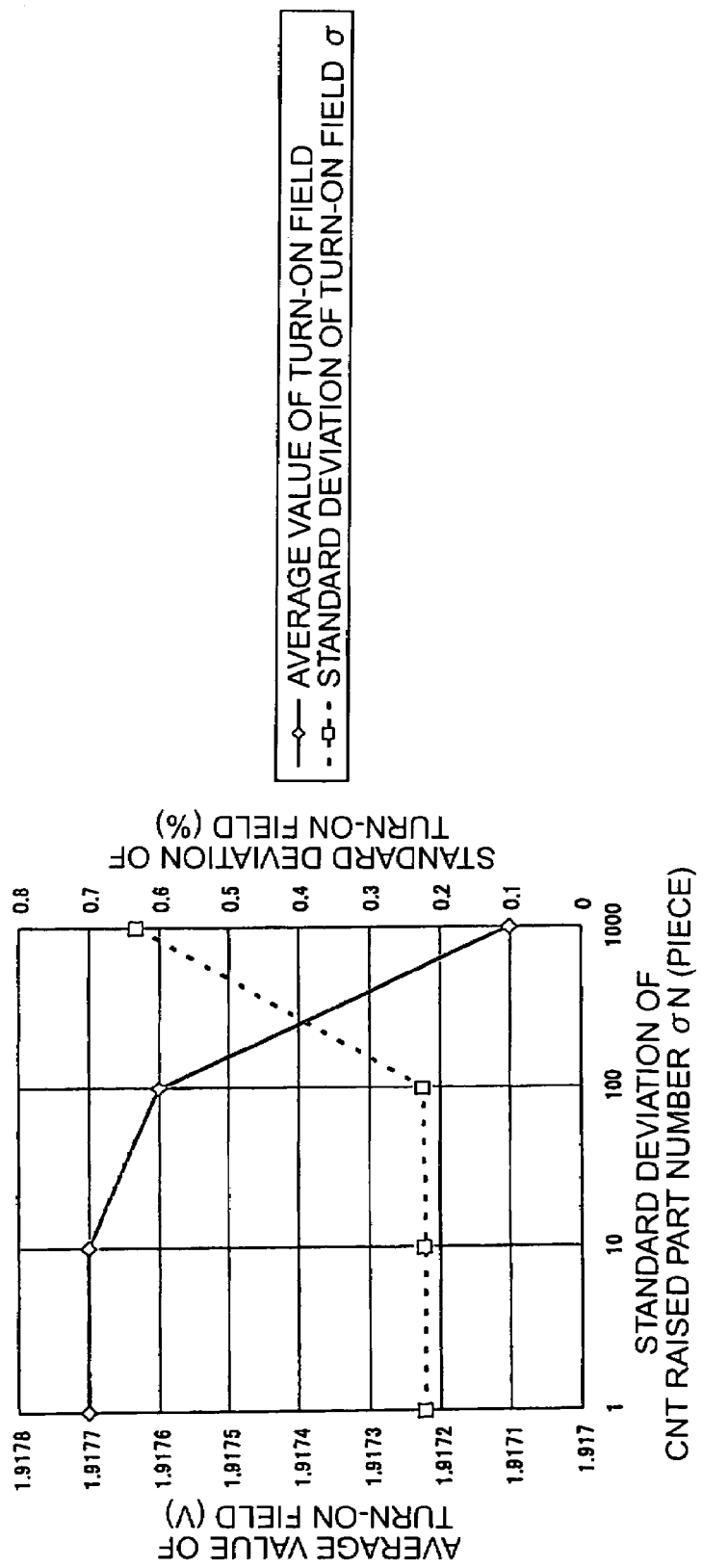
FIG. 44 is a graph representing a relationship between a standard deviation of heights of raised parts of CNT and an average value of turn-on fields in the designing method for the field emission display according to Embodiment 14 of the present invention.

Further, FIG. 44 shows results of finding the turn-on field average value and its fluctuation (the turn-on field standard deviation) when the raised part number standard deviation varies. In FIG. 44, the calculation is conducted where $N_{ave}$=10000, H=7 μm, and $\sigma_H$=0.8 μm. FIG. 44 reveals that the smaller the standard deviation of the number of raised parts, the smaller the turn-on field fluctuation.

The designing method according to this embodiment, since a random number is used, results to be found differ based on an initial value for generating a random number or the like. Therefore, it is necessary to check whether or not the solutions are relatively stable. According to this embodiment, the emission characteristics for 100 pixels are found to obtain the turn-on field average value and the standard deviation, and a large difference does not occur even the initial number for generating a random number is changed.

Up to now, a review for how much the fluctuation can be suppressed by increasing how many emission sites can be made only by means of experiment data extrapolation, and there are no designing methods for checking how much the fluctuation can be suppressed by setting the heights to which value and by making the heights uniform at which level. According to this embodiment, quantitative prediction and designing can be conducted. According to this embodiment, the number and heights of the CNT raised parts are set as parameters generated randomly with a certain distribution, and if needed, other parameters may be introduced. Conceivable introduced parameters include a CNT diameter, a distance between raised parts, and a work function of the emission part. A method of generating a random number and a distribution function need to be suitably and arbitrarily selected. Note that, the designing method according to this embodiment is applicable to a case where an adhesive tape is attached to the CNT printed layer and peeled off to expose and raise the CNTs in addition to a case where the laser irradiation is carried out to expose and raise the CNTs.

The present invention has been described above but should not be limited to the embodiments described above. The present invention certainly may include possible combination of the above embodiments and the like.

What is claimed is:

1. A method of manufacturing a field emission display which comprises a cathode substrate and a fluorescent screen glass opposed to the cathode substrate, and emits light when an electron emitted from a carbon nanotube printed layer containing a carbon nanotube of the cathode electrode enters a fluorescent material of the fluorescent screen glass, the method comprising:

irradiating a surface of the carbon nanotube printed layer with a laser beam to form a carbon nanotube raised area; and spatially modulating the energy density within the laser beam while irradiating the surface of the carbon nanotube printed layer, wherein the spatially modulating includes irradiating a first portion of the surface of the carbon nanotube printed layer with an energy density equal to or higher than a threshold value to form the carbon nanotube raised area, and irradiating a second portion of the surface of the carbon nanotube printed layer with an energy density lower than the threshold value to raise the carbon nanotube.

2. A method of manufacturing a field emission display according to claim 1, wherein the carbon nanotube is raised to have a height in a range from 3 μm to 10 μm from an upper surface of the carbon nanotube printed layer.

3. A method of manufacturing a field emission display according to claim 1, wherein the energy density of the laser beam used to form the carbon nanotube raised area is in a range from 100 mJ/cm$^2$ to 500 mJ/cm$^2$.

4. A method of manufacturing a field emission display according to claim 3, wherein the spatially modulating the energy density within the laser beam is carried out with a spatially modulated pattern formed of a circular shape having a diameter equal to a predetermined maximum raised part height of the carbon nanotube in the carbon nanotube raised area.

5. A method of manufacturing a field emission display according to claim 1, wherein the irradiating the first and second portion of the surface of the carbon nanotube printed layer includes forming the carbon nanotube raised area in a stripe or dot pattern.

6. A method of manufacturing a field emission display according to claim 5, wherein the carbon nanotube raised area in a dot pattern is arranged in hexagonal close-packed lattices.

7. A method of manufacturing a field emission display according to claim 3, wherein the spatially modulating the energy density of the laser beam is carried out with a spatially modulated pattern formed of a polygonal shape having a maximum diagonal line length equal to the height of the predetermined maximum raised part height.

8. A method of manufacturing a field emission display according to claim 3, wherein the spatially modulating the energy density of the laser beam is carried out with a spatially modulated pattern formed of a shape similar to a circle or a polygon, and the shape has a length along a diameter, a side, or a diagonal line equal to the height of the predetermined maximum raised part height.

9. A method of manufacturing a field emission display which comprises a cathode substrate and a fluorescent screen glass opposed to the cathode substrate, and emits light when an electron emitted from a carbon nanotube printed layer containing a carbon nanotube of the cathode electrode enters a fluorescent material of the fluorescent screen glass, the method comprising:

a laser beam irradiation step of irradiating a surface of the carbon nanotube printed layer with a laser beam having its energy density to be spatially modulated, wherein the laser irradiation is carried out to cause a relationship between a boundary length L (μm) from the carbon nanotube raised area to an area where no carbon nanotube is raised and a set value σ (%) of turn-on field fluctuations in the cathode substrate to meet a formula of $L \geq 7.2 \times 10^4/\sigma^2$, and cause a boundary length per mm$^2$ when a set value h (μm) represents a height of the exposed carbon nanotube in the carbon nanotube raised area to be $10^6/h$ (μm) or lower.

10. A method of manufacturing a field emission display which comprises a cathode substrate and a fluorescent screen glass opposed to the cathode substrate, and emits light when an electron emitted from a carbon nanotube printed layer containing a carbon nanotube of the cathode electrode enters a fluorescent material of the fluorescent screen glass, the method comprising:

a laser beam irradiation step of irradiating a surface of the carbon nanotube printed layer with a laser beam having its energy density to be spatially modulated; and for formation of the cathode substrate, the steps of laminating a cathode electrode, the carbon nanotube printed layer, an insulating layer, and a leading electrode on the substrate, forming an electron passage hole up to the insulating film and the leading electrode to expose the carbon nanotube printed layer, wherein the laser beam irradiation step includes irradiating an exposed portion of the carbon nanotube printed layer with the laser beam having the energy density to be spatially modulated through the electron passage hole, and coating the leading electrode situated on an uppermost part of the cathode substrate with a silane coupling agent before the laser beam irradiation step.

11. A method of manufacturing a field emission display which comprises a cathode substrate and a fluorescent screen glass opposed to the cathode substrate, and emits light when an electron emitted from a carbon nanotube printed layer containing a carbon nanotube of the cathode electrode enters a fluorescent material of the fluorescent screen glass, comprising, for formation of the cathode substrate, the steps of:

forming a cathode electrode on a front surface of a glass plate;

forming a through hole in the cathode electrode;

forming a carbon nanotube printed layer on the cathode electrode; and irradiating the carbon nanotube printed layer with a laser beam from a rear surface of the glass plate through the through hole to expose and raise the carbon nanotube, wherein the cathode electrode formation step includes applying on the glass plate a conductive paste in which a very fine particle which disappears at an allowable temperature limit for glass or lower; and the through hole formation step includes baking the glass plate, on which the cathode electrode is formed, at a temperature equal to or lower than the allowable temperature limit for glass and equal to or higher than a temperature at which the fine particle disappears.

* * * * *